United States Patent
Yi et al.

(10) Patent No.: US 11,489,984 B2
(45) Date of Patent: Nov. 1, 2022

(54) FREQUENCY AND SPATIAL DOMAIN IMAGE PROCESSING METHOD FOR IMAGE MARKING AND MARK DETECTION, APPARATUS, AND STORAGE MEDIUM

(71) Applicant: Tencent Technology (Shenzhen) Company Limited, Guangdong (CN)

(72) Inventors: Cheng Yi, Shenzhen (CN); Cheng Luo, Shenzhen (CN); Bin Li, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 17/229,540

(22) Filed: Apr. 13, 2021

(65) Prior Publication Data

US 2021/0234989 A1    Jul. 29, 2021

Related U.S. Application Data

(63) Continuation of application No. PCT/CN2019/127788, filed on Dec. 24, 2019.

(30) Foreign Application Priority Data

Jan. 2, 2019    (CN) .......................... 201910001590.2

(51) Int. Cl.
*H04N 1/32* (2006.01)
*G06T 1/00* (2006.01)

(52) U.S. Cl.
CPC ....... *H04N 1/32154* (2013.01); *G06T 1/0021* (2013.01); *H04N 1/32267* (2013.01)

(58) Field of Classification Search
CPC ............ H04N 1/32154; H04N 1/32267; G06T 1/0021; G06T 2201/0052; G06T 1/005; G06T 1/00
See application file for complete search history.

(56) References Cited

U.S. PATENT DOCUMENTS

| 2008/0301767 | A1 | 12/2008 | Picard et al. |
| 2015/0036873 | A1 | 2/2015 | Petrovic et al. |
| 2017/0329943 | A1* | 11/2017 | Choi ................. G06F 21/10 |

FOREIGN PATENT DOCUMENTS

| CN | 1952978 A | 4/2007 |
| CN | 101489133 A | 7/2009 |

(Continued)

OTHER PUBLICATIONS

International Search Report and Written Opinion for PCT/CN2019/127788 dated Mar. 30, 2020, 10p, in Chinese Language.

(Continued)

*Primary Examiner* — Christopher Wait
(74) *Attorney, Agent, or Firm* — Crowell & Moring LLP

(57) ABSTRACT

This application relates to an image processing method and apparatus, a storage medium, and a computer device. The method includes: obtaining a frequency domain mark image, the frequency domain mark image being obtained by performing frequency domain transformation on a spatial domain mark image; obtaining a transparency parameter configured corresponding to the frequency domain mark image; obtaining target page data; and performing layer superimposition rendering of the frequency domain mark image and the target page data according to the transparency parameter. The solution provided in this application can effectively protect target page data.

20 Claims, 8 Drawing Sheets

(56) References Cited

FOREIGN PATENT DOCUMENTS

| CN | 101916427 A |   | 12/2010 |
|----|-------------|---|---------|
| CN | 102142131 A |   | 8/2011  |
| CN | 104616240 A |   | 5/2015  |
| CN | 106023059 A |   | 10/2016 |
| CN | 106097237 A |   | 11/2016 |
| CN | 106960411 A | * | 7/2017  |
| CN | 106960411 A |   | 7/2017  |
| CN | 108510426 A |   | 9/2018  |
| CN | 108959509 A |   | 12/2018 |
| CN | 109767378 A |   | 5/2019  |

OTHER PUBLICATIONS

English Language translation of Search Report for PCT/CN2019/127788 dated Mar. 30, 2020, 2p.
First Office Action for CN201910001590.2 dated May 28, 2020, 10p, in Chinese language.
Second Office Action for CN 201910001590.2 dated Dec. 1, 2020, 3p, in Chinese language.
Concise Explanation of Relevance for the First Chinese Office Action and Search Report and Second Chinese Office Action for CN201910001590.2, 2p.

* cited by examiner

FREQUENCY AND SPATIAL DOMAIN IMAGE PROCESSING METHOD FOR IMAGE MARKING AND MARK DETECTION, APPARATUS, AND STORAGE MEDIUM

RELATED APPLICATIONS

This application is a continuation application of International Application No. PCT/CN2019/127788, filed Dec. 24, 2019 and titled "IMAGE PROCESSING METHOD AND APPARATUS, STORAGE MEDIUM AND COMPUTER DEVICE," which claims priority to Chinese Patent Application No. 201910001590.2, entitled "IMAGE PROCESSING METHOD AND APPARATUS" and filed on Jan. 2, 2019. The entireties of the above applications are incorporated by reference.

TECHNICAL FIELD

This application relates to the field of image processing technologies, and in particular, to an image processing method and apparatus, a storage medium, and a computer device.

BACKGROUND

In a digital watermark technology, mark information is embedded in a to-be-protected digital medium (such as multimedia, a file, or software). With the development of computer technologies, the digital watermark technology is widely applied in fields of data protection and data tracking. In an ordinary method for protecting an image, a file, or a page by using a watermark, generally, a spatial domain watermark image directly superimposes the to-be-protected image, file, or page. However, the color of the watermark is generally different from that of an original image by using such a spatial domain watermarking method, making it easy for a user to perceive the watermark.

In the ordinary spatial domain watermarking method, the content, location information, and the like of the watermark are very obvious and can be easily acquired by a lawbreaker to take a corresponding precaution. However, to make it difficult for a user to differentiate the watermark in spatial domain, superimposed watermark information needs to be extremely weak and is therefore easily susceptible to interference from image compression, smearing, or the like, and as a result data fails to be protected.

SUMMARY

Based on this, an image processing method and apparatus, a storage medium, and a computer device are provided, which can resolve the technical problem that data cannot be effectively protected by using an ordinary digital watermark method.

An image processing method is provided, applicable to a computer device, the method including:

obtaining a frequency domain mark image, the frequency domain mark image being obtained by performing frequency domain transformation on a spatial domain mark image; obtaining a transparency parameter configured corresponding to the frequency domain mark image; obtaining target page data; and performing layer superimposition rendering of the frequency domain mark image and the target page data according to the transparency parameter.

An image processing apparatus is provided, including:

an obtaining module, configured to obtain a frequency domain mark image, the frequency domain mark image being obtained by performing frequency domain transformation on a spatial domain mark image, the obtaining module being further configured to obtain a transparency parameter configured corresponding to the frequency domain mark image, and the obtaining module being further configured to obtain target page data; and a rendering module, configured to perform layer superimposition rendering of the frequency domain mark image and the target page data according to the transparency parameter.

A computer-readable storage medium is provided, storing a computer program, the computer program, when executed by a processor, causing the processor to perform operations of the image processing method.

A computer device is provided, including a memory and a processor, the memory storing a computer program, the computer program, when executed by the processor, causing the processor to perform operations of the image processing method.

According to the image processing method and apparatus, the storage medium, and the computer device, a frequency domain mark image is obtained by performing frequency domain transformation on a spatial domain mark image, and layer superimposition rendering is performed on the frequency domain mark image and target page data according to a pre-configured transparency parameter. In this way, a transparentized frequency domain mark image is included in a displayed page. Because distribution locations of pixels are different in frequency domain and spatial domain, mark information can be adequately hidden, to achieve adequate robustness of compression resistance and smearing resistance. When a user captures or shares a displayed rendered image, a transmitted page image automatically includes the hidden frequency domain mark image, to facilitate infringement tracking, copyright protection, and other operations on leaked page data, thereby effectively protecting the page data.

An image processing method is provided, applicable to a computer device, the method including:

obtaining a captured page image captured from a rendered page, the rendered page being obtained by performing layer superimposition rendering on a frequency domain mark image and page data according to a transparency parameter; performing frequency domain transformation on the captured page image to obtain a frequency domain image, image data of the frequency domain image including spatial domain mark data corresponding to the frequency domain mark image and page data belonging to frequency domain; filtering out page data meeting a frequency interference condition from the image data of the frequency domain image; and determining a spatial domain mark image corresponding to the frequency domain mark image according to a filtering result.

An image processing apparatus is provided, including:

a captured page image obtaining module, configured to obtain a captured page image captured from a rendered page, the rendered page being obtained by performing layer superimposition rendering of a frequency domain mark image and page data according to a transparency parameter;

a transformation module, configured to perform frequency domain transformation on the captured page image to obtain a frequency domain image, image data of the frequency domain image including spatial domain mark data corresponding to the frequency domain mark image and page data belonging to frequency domain;

a filtering module, configured to filter out page data meeting a frequency interference condition from the image data of the frequency domain image; and a spatial domain mark image determining module, configured to determine a spatial domain mark image corresponding to the frequency domain mark image according to a filtering result.

A computer-readable storage medium is provided, storing a computer program, the computer program, when executed by a processor, causing the processor to perform operations of the image processing method.

A computer device is provided, including a memory and a processor, the memory storing a computer program, the computer program, when executed by the processor, causing the processor to perform operations of the image processing method.

According to the image processing method and apparatus, the computer-readable storage medium, and the computer device, a captured page image is captured from a rendered page, the rendered page being obtained by performing layer superimposition rendering of a frequency domain mark image and page data according to a transparency parameter. In this way, when a user captures a displayed rendered image, a captured page image automatically includes the hidden frequency domain mark image. Frequency domain transformation is performed on the captured page image to obtain a frequency domain image, page data meeting a frequency interference condition is then filtered out from the image data of the frequency domain image, and a spatial domain mark image corresponding to the frequency domain mark image is determined according to a filtering result. In this way, the spatial domain mark image may be extracted from the captured page image by performing frequency domain transformation and filtering, thereby obtaining hidden mark information. Infringement tracking, copyright protection, and other operations can be performed on leaked page data according to the mark information, thereby effectively protecting the page data.

An image processing method is provided, applicable to a computer device, the method including:

obtaining a captured page image captured from a rendered page, the rendered page being obtained by performing layer superimposition rendering of a frequency domain mark image and page data according to a transparency parameter; determining an interference brightness value according to brightness values of pixels in the captured page image; respectively subtracting the interference brightness value from the brightness values of the pixels, to obtain corresponding corrected brightness values; and generating a spatial domain mark image corresponding to the frequency domain mark image according to the corrected brightness values of the pixels in the captured page image.

An image processing apparatus is provided, including:

a captured page image obtaining module, configured to obtain a captured page image captured from a rendered page, the rendered page being obtained by performing layer superimposition rendering of a frequency domain mark image and page data according to a transparency parameter;

an interference brightness value determining module, configured to determine an interference brightness value according to brightness values of pixels in the captured page image;

a calculation module, configured to respectively subtract the interference brightness value from the brightness values of the pixels, to obtain corresponding corrected brightness values; and a spatial domain mark image generation module, configured to generate a spatial domain mark image corresponding to the frequency domain mark image according to the corrected brightness values of the pixels in the captured page image.

A computer-readable storage medium is provided, storing a computer program, the computer program, when executed by a processor, causing the processor to perform operations of the image processing method.

A computer device is provided, including a memory and a processor, the memory storing a computer program, the computer program, when executed by the processor, causing the processor to perform operations of the image processing method.

According to the image processing method and apparatus, the computer-readable storage medium, and the computer device, a captured page image is captured from a rendered page, the rendered page being obtained by performing layer superimposition rendering of a frequency domain mark image and page data according to a transparency parameter. When a user captures a displayed rendered image, a captured page image automatically includes the hidden frequency domain mark image. An interference brightness value is determined according to brightness values of pixels in the captured page image, and the interference brightness value is respectively subtracted from the brightness values of the pixels, to obtain corresponding corrected brightness values. A spatial domain mark image corresponding to the frequency domain mark image is then generated according to the corrected brightness values of the pixels. In this way, it is convenient to effectively extract the spatial domain mark image from the captured page image, thereby obtaining hidden mark information. Infringement tracking, copyright protection, and other operations can be performed on leaked page data according to the mark information, thereby effectively protecting the page data.

DESCRIPTION OF EMBODIMENTS

To make the objectives, technical solutions, and advantages of this application clearer and more understandable, this application is further described in detail below with reference to the accompanying drawings and embodiments. It is to be understood that the specific embodiments described herein are merely used for explaining this application, but are not intended to limit this application.

Figure 1:
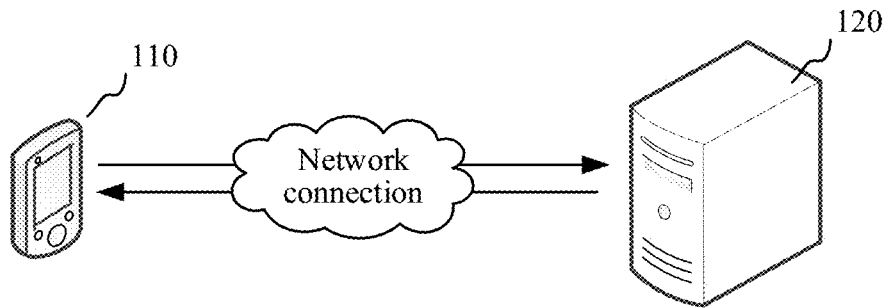
FIG. 1 is a diagram of an application environment of an image processing method according to an embodiment.

FIG. 1 is a diagram of an application environment of an image processing method according to an embodiment. Referring to FIG. 1, the image processing method is applied to an image processing system. The image processing system includes a terminal 110 and a server 120. The terminal 110 and the server 120 are connected by a network. The terminal 110 may be a desktop terminal or a mobile terminal, and the mobile terminal may be at least one of a mobile phone, a tablet computer, a notebook computer, and the like. The server 120 may be implemented by using an independent server or a server cluster that includes a plurality of servers.

The terminal 110 and the server 120 may be separately configured to perform the image processing method independently. Alternatively, the terminal 110 and the server 120 collaboratively perform the image processing method. For example, the terminal 110 or the server 120 obtains a frequency domain mark image, and performs the image processing method. Alternatively, the terminal 110 transmits a spatial domain mark image to the server 120, and the server 120 obtains the spatial domain mark image and performs the image processing method.

Figure 2:
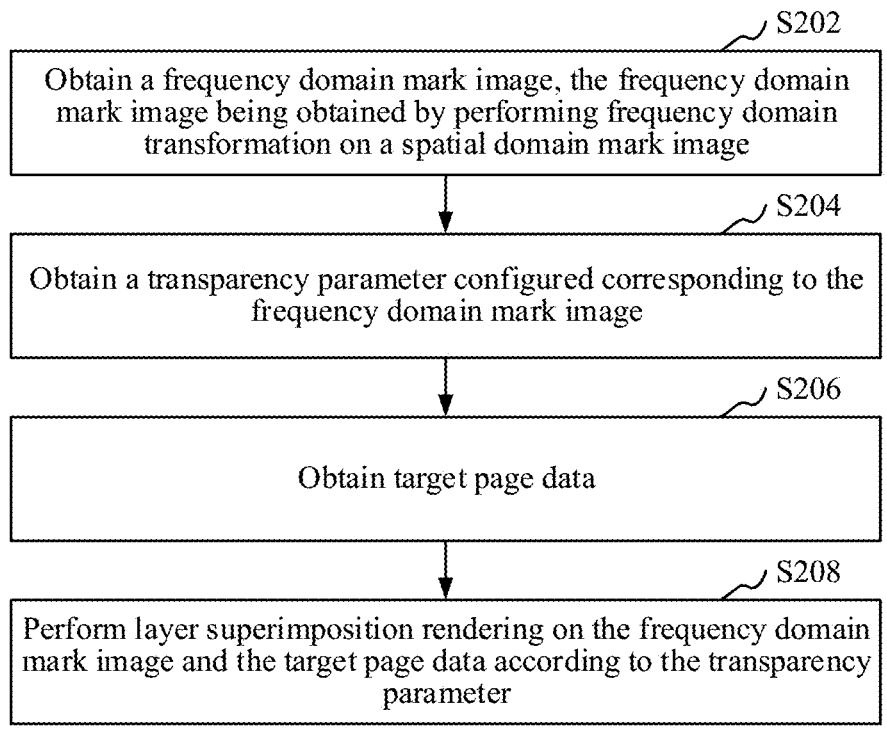
FIG. 2 is a schematic flowchart of an image processing method according to an embodiment.

As shown in FIG. 2, in an embodiment, an image processing method is provided. This embodiment is described by using an example in which the method is applied to the computer device (the terminal 110 or the server 120) in FIG. 1. Referring to FIG. 2, the image processing method includes the following steps:

S202. Obtain a frequency domain mark image, the frequency domain mark image being obtained by performing frequency domain transformation on a spatial domain mark image.

The spatial domain mark image is an image with image data in spatial domain. The frequency domain mark image is an image with image data in frequency domain. Both the spatial domain mark image and the frequency domain mark image may be referred to as mark images, and respectively represent mark information in terms of space and mark information in terms of frequency domain.

The mark image is an image that may be embedded in to-be-protected information to mark the to-be-protected information, to facilitate subsequent infringement tracking, copyright protection, and other operations. The mark image is an image generated according to mark information, and the mark information may include text or graphs. The mark image is also referred to as a watermark image.

Spatial domain of an image is a two-dimensional plane where an image plane is located. Processing an image in spatial domain includes changing grayscale values of pixels and keeping locations of the pixels unchanged. Frequency domain of an image is spatial frequencies of change of grayscale values of pixels of the image along with the change of location. The distribution feature of information is represented by using a spectrum. For example, a remote-sensing image can be transformed, through Fourier transform, from spatial domain to frequency domain including only different pieces of frequency information. Information such as a grayscale mutation portion, a region with a complex image structure, an image detail, and interference noise on the original image is concentrated in a high-frequency region, and information about a portion where grayscale changes gently on the original image is concentrated in a low-frequency region.

Mutual conversion may be performed between the frequency domain mark image and the spatial domain mark image through image transformation or inverse transformation such as discrete cosine transform or Fourier transform. The frequency domain mark image is obtained by performing frequency domain transformation on the spatial domain mark image.

The computer device may obtain the frequency domain mark image obtained by performing frequency domain transformation on the spatial domain mark image. In an embodiment, the computer device may first obtain a spatial domain mark image, and then performs frequency domain transformation on the spatial domain mark image, to obtain the frequency domain mark image. Alternatively, the computer device may directly obtain a frequency domain mark image obtained by performing frequency domain transformation on a spatial domain mark image. The frequency domain mark image may be generated locally, or may be generated by another computer device according to the spatial domain mark image and then transmitted to the computer device.

In an embodiment, step S202, that is, the operation of obtaining a frequency domain mark image, includes: obtaining a target page access instruction; and obtaining the frequency domain mark image according to the target page access instruction. Step S206, that is, the step of obtaining target page data, includes: obtaining the target page data to which the target page access instruction points.

The target page access instruction is a request instruction for accessing a target page. The target page access instruction may be an instruction for viewing a target page, an instruction for entering a target page, an instruction for editing a target page, or the like. A target page to which the target page access instruction points may be, for example, an application page in an application, a web page, or a file page.

Optionally, the computer device may receive a target page access instruction. When the computer device is a terminal, the terminal may obtain a target page access instruction that is triggered by a user and is used for accessing a target page. Correspondingly, the terminal performs the image processing method and implements layer superimposition rendering. In an embodiment, when a client of an application is run on the terminal, the client performs the image processing method. When the computer device is a server, a user may trigger a target page access instruction by using a terminal. The server receives the target page access instruction forwarded by the terminal, performs the image processing method to implement layer superimposition rendering, and feeds a rendered page back to the terminal, to enable the terminal to display the rendered page.

Further, after the computer device obtains the target page access instruction, the computer device may obtain a frequency domain mark image according to the target page access instruction. The frequency domain mark image may be generated in real time after the computer device obtains the target page access instruction, or may be generated in advance and then stored. For example, the frequency domain mark image may be generated in advance, and stored in the computer device. Alternatively, the frequency domain mark image may be generated in advance and stored in a storage medium of the computer device. The computer device obtains the frequency domain mark image from the storage medium.

In an embodiment, the computer device may obtain the target page data to which the target page access instruction points. In this way, when accessing the target page, the computer device may perform layer superimposition rendering on the frequency domain mark image and the target page data according to a transparency parameter, and display a rendered page after the rendering.

In the foregoing embodiment, after a target page access instruction is obtained, the operation of obtaining a frequency domain mark image is performed, the target page data to which the target page access instruction points is obtained, and layer superimposition rendering is performed on the frequency domain mark image and the target page data according to a transparency parameter. In this way, when a to-be-accessed target page is displayed, a page added with the frequency domain mark image is displayed. When a user captures a displayed rendered image, a captured page image automatically includes the hidden frequency domain mark image, to facilitate infringement tracking, copyright protection, and other operations on leaked page data, thereby effectively protecting the page data.

In an embodiment, the image processing method further includes: obtaining a page operation instruction; and performing, when the page operation instruction is used for transmitting the target page data, the operation of obtaining a frequency domain mark image.

The page operation instruction is an instruction for triggering an operation performed on a target page. The operation performed on a target page may be, for example, a page editing operation, a page content selection operation, a page sharing operation, or a page image capture operation. That the page operation instruction is used for transmitting the target page data, that is, when the computer device performs an operation corresponding to the instruction, the corresponding target page data may be transmitted. The transmitting the target page data may be transmitting complete target page data or transmitting partial target page data.

Optionally, the computer device may obtain a page operation instruction, and perform, when the page operation instruction is used for transmitting the target page data, the operation of obtaining a frequency domain mark image. The page operation instruction used for transmitting the target page data may be, for example, a page sharing instruction or a page image capture instruction.

In an embodiment, the computer device displays a target page. When obtaining a page operation instruction, the computer device determines whether a page operation that is performed on the target page and corresponds to the page operation instruction is an operation used for transmitting the target page data. When the page operation is the operation used for transmitting the target page data, for example, a page sharing operation or a page image capture operation, the computer device intercepts the page operation, obtains the frequency domain mark image and the target page data, performs layer superimposition rendering on the frequency domain mark image and the target page data according to a transparency parameter for redisplay, and then performs the corresponding page operation specific to a redisplayed rendered page.

In the foregoing embodiment, a page operation instruction is obtained, and when the page operation instruction is used for transmitting the target page data, the operation of obtaining a frequency domain mark image is performed. In this way, when a user tries to transmit the target page data, layer superimposition rendering may be performed on the frequency domain mark image and the target page data according to a transparency parameter for display. Therefore, data transmitted by the user is embedded with hidden frequency domain information, to facilitate infringement tracking, copyright protection, and other operations on leaked page data, thereby effectively protecting the page data.

In an embodiment, step S202, that is, the operation of obtaining a frequency domain mark image, includes: determining a user identifier that identify a user; and obtaining a frequency domain mark image corresponding to the user identifier.

The user identifier is used for identifying a user, and may include at least one of a letter, a character, a Chinese character, or an image. In an embodiment, a user may log in to a terminal by using a user identifier. The computer device determines a user identifier of the user who has logged into the system, and obtains a frequency domain mark image corresponding to the user identifier. The user identifier may be unique.

In an embodiment, after determining the user identifier of the user who has logged into the system, the computer device may generate a frequency domain mark image corresponding to the user identifier in real time and obtain the frequency domain mark image. In another embodiment, the computer device may obtain a plurality of user identifiers (including a user identifier of the user currently logged into the system and a user identifier of a user who has not logged in currently) in advance, generate frequency domain mark images corresponding to the plurality of user identifiers, and obtain, as required, a frequency domain mark image corresponding to the user identifier of the user currently logged into the system.

In the foregoing embodiment, the computer device obtains a frequency domain mark image corresponding to a user identifier that has logged in currently. Therefore, a to-be-protected page may be marked by using the frequency domain mark image corresponding to the user identifier that has logged in currently, to facilitate infringement tracking, copyright protection, and other operations on leaked page data, thereby effectively protecting the page data.

In an embodiment, a step of generating the frequency domain mark image includes: obtaining the user identifier; determining mark information corresponding to the user identifier; generating a spatial domain mark image corresponding to the user identifier according to the mark information; and performing frequency domain transformation on the spatial domain mark image, to obtain the frequency domain mark image corresponding to the user identifier.

Optionally, the computer device may obtain the user identifier of the user currently logged in, or obtain user identifiers corresponding to all registered users. Further, the computer device determines mark information corresponding to the user identifier. The mark information may include information such as a user account, a mobile number, an employee ID, or an enterprise identifier. The computer device may generate a spatial domain mark image corresponding to the user identifier according to the mark information, and then performs frequency domain transformation on the spatial domain mark image, to obtain the frequency domain mark image. An algorithm for performing frequency domain transformation on the spatial domain mark image may be a linearly separable frequency domain transformation algorithm, for example, wavelet transform, discrete cosine transform, or Fourier transform.

In an embodiment, the computer device may generate a spatial domain mark image with grayscale according to the mark information. That is, grayscale values of valid pixels corresponding to the mark information are set to a first pixel value. The first pixel value is, for example, 255. Grayscale values of invalid pixels other than the valid pixels are set to a second pixel value. The second pixel value is, for example, 0.

In an embodiment, after performing forward transformation on the spatial domain mark image by using a frequency domain transformation algorithm to obtain the frequency domain mark image, the computer device may store the frequency domain mark image (cached in an internal memory, stored as a file, or the like), and obtain the frequency domain mark image from a corresponding storage medium as required.

In the foregoing embodiment, a spatial domain mark image is generated according to mark information corresponding to a user identifier, and frequency domain transformation is then performed to transform the spatial domain mark image into the frequency domain mark image. In this way, the spatial domain mark image may be transformed into the frequency domain mark image, so as to perform watermark superimposing, which is convenient and quick. In addition, the obtained frequency domain mark image corresponds to the user identifier. In this way, when page data is leaked, a leaker may be tracked, to perform infringement tracking, copyright protection, and other operations, thereby effectively protecting the page data.

S204. Obtain a transparency parameter configured corresponding to the frequency domain mark image.

The transparency parameter is a parameter for performing transparency processing on an image, and the value of the transparency parameter may be any value ranging from 0 to 1. In an embodiment, the value of the transparency parameter closer to 0 indicates that the image is more transparent. Alternatively, it may be set that the value of the transparency parameter closer to 1 indicates that the image is more transparent.

Optionally, the computer device may pre-configure a transparency parameter corresponding to the frequency domain mark image, and the transparency parameter determines a transparency degree of the frequency domain mark image during layer rendering. When obtaining the frequency domain mark image, the computer device may correspondingly query the transparency parameter that is configured corresponding to the frequency domain mark image.

In an embodiment, during processing of an image, image data of the image may be converted into image data represented by using four channels. The four channels include an R (red) channel, a G (green) channel, a B (blue) channel, and an alpha channel. Image data corresponding to the R channel, the G channel, and the B channel determines a color condition of the image, but image data corresponding to the alpha channel determines a transparency degree of the image. In this case, the transparency parameter may be a coefficient α corresponding to the alpha channel.

S206. Obtain target page data.

Optionally, the computer device may directly obtain target page data. In an embodiment, the computer device obtains the target page access instruction, and further obtains, according to an access address included in the target page access instruction, target page data to which the target page access instruction points and that is in spatial domain. The target page data is data used for generating a target page.

S208. Perform layer superimposition rendering on the frequency domain mark image and the target page data according to the transparency parameter.

Layer superimposition rendering is to perform superimposition rendering on a plurality of layers from top to bottom. When layer superimposition rendering is performed on a plurality of layers, pixels of an upper layer superimpose pixels of a lower layer. Optionally, the computer device may superimpose the frequency domain mark image on a to-be-protected target page according to the transparency parameter for layer superimposition rendering.

Figure 3:
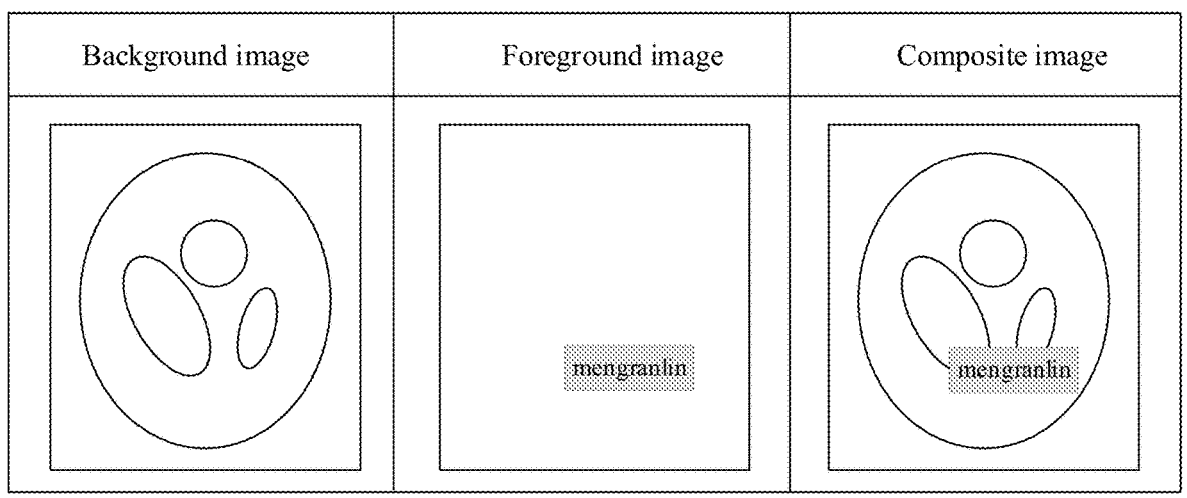
FIG. 3 is a schematic diagram of the effect of performing layer superimposition rendering according to an embodiment.

FIG. 3 is a schematic diagram of the effect of performing layer superimposition rendering according to an embodiment. As shown in FIG. 3, the image on the left is a background image, the image in the middle is a foreground image, and the image on the right is a composite image obtained by performing layer superimposing on the background image and the foreground image. That is, the foreground image is superimposed on the background image, and pixels of the foreground image superimpose pixels of the background image. In the schematic diagram shown in FIG. 3, because an alpha value is relatively large, the foreground image is opaque, which may be clearly seen from the composite image. When the alpha value of the foreground image is relatively small, the foreground image is in a transparent state. In this application, when the layer superimposition rendering are performed, the alpha value of the foreground image is set to a relatively small value. In this way, the foreground image may be in the relatively transparent state.

In an embodiment, step S208 includes: converting the frequency domain mark image into a corresponding transparent image according to the transparency parameter; using the transparent image as a foreground layer; generating a background layer according to the target page data; and performing layer superimposition rendering by superimposing the background layer with the foreground layer.

Optionally, the computer device converts the frequency domain mark image into a corresponding transparent image according to the transparency parameter, and uses the transparent image as a foreground layer. The computer device generates a background layer according to the target page data, and superimposes, during rendering of a page, the background layer with the foreground layer for performing layer superimposition rendering.

In an embodiment, the computer device cannot change an alpha value (that is, a transparency value) corresponding to an alpha channel of an image during rendering of a page, and can only perform superimposition and rendering on a plurality of layers. Therefore, to superimpose the target page with the frequency domain mark image for display, the frequency domain mark image may be first converted into a transparentized transparent image, and the transparent image is then superimposed on the target page for final display, so that a hidden watermark may be added to the target page.

In an embodiment, the step of converting the frequency domain mark image into a corresponding transparent image according to the transparency parameter includes: determining frequency values corresponding to pixels in the frequency domain mark image; calculating transparency values of the corresponding pixels according to the transparency parameter and the frequency values corresponding to the pixels; respectively obtaining brightness values of the pixels in the frequency domain mark image; and generating the transparent image corresponding to the frequency domain mark image according to the transparency values and the brightness values of the pixels in the frequency domain mark image.

Optionally, that the computer device converts the frequency domain mark image into a corresponding transparent image includes: converting the frequency domain mark image into an image with an alpha channel. The alpha channel is a manner for processing a transparent color. One alpha value (that is, a transparency value) is stored in each pixel, and is used for representing a transparency degree of the pixel, so as to achieve transparent light and shadow effects, for example, in a game. A transparency value added with an alpha channel becomes a pixel represented by using RGBA.

In an embodiment, because the frequency domain mark image is a frequency domain image of an image, the computer device may determine a frequency value corresponding to each pixel in the frequency domain mark image, and then multiply the frequency value by the transparency parameter, to obtain a transparency value corresponding to the alpha channel. Alternatively, the computer device may multiply the frequency value by an inverse value of the transparency parameter (that is, (1—transparency parameter)), to obtain a transparency value corresponding to the alpha channel. The transparency value corresponding to the alpha channel is used for representing a transparency degree of an image. When the transparency value corresponding to the alpha channel is 0, the image is completely transparent, and when the transparency value corresponding to the alpha channel is 1, the image is completely opaque. It may be understood that, the transparency value may be alternatively inversely set. For example, when the transparency value corresponding to the alpha channel is 1, the image is completely transparent, and when the transparency value corresponding to the alpha channel is 0, the image is completely opaque. This is not limited herein.

In an embodiment, when image transparency processing is performed on the frequency domain mark image, transparency values, of an invalid pixel region, corresponding to the alpha channel in the frequency domain mark image are 0, but transparency values, of a valid pixel region, corresponding to the alpha channel are values obtained by multiplying frequency values of current pixels by a coefficient $\alpha$ (for example, $\alpha=0.1$, where a higher coefficient $\alpha$ indicates that a watermark is clearer, and a lower coefficient $\alpha$ indicates that a watermark is less clear), to obtain a transparent image.

In an embodiment, that the computer device converts the frequency domain mark image into a corresponding transparent image includes: converting the current frequency domain mark image into a four-channel transparent image with an alpha channel. When the spatial domain mark image is a one-channel grayscale image and the computer device converts the frequency domain mark image into a corresponding transparent image, brightness values corresponding to the R channel, the G channel, and the B channel may be respectively set to a preset brightness value (for example, 255), a grayscale value of the spatial domain mark image, or the like. In an embodiment, when the spatial domain mark image is a three-channel color image, the computer device may respectively set brightness values corresponding to the R channel, the G channel, and the B channel to brightness values, in the corresponding channels, of pixels in the spatial domain mark image.

Further, the computer device generates the transparent image corresponding to the frequency domain mark image according to the transparency values and the brightness values of the pixels in the frequency domain mark image. In this case, the generated transparent image is a transparent image with an alpha channel.

In the foregoing embodiment, the transparency values of the corresponding pixels are calculated according to the transparency parameter and the frequency values corresponding to the pixels. Therefore, the transparent image corresponding to the frequency domain mark image may be conveniently and quickly generated according to the transparency values and the brightness values of the pixels in the frequency domain mark image.

In an embodiment, when the computer device superimposes the background layer with the foreground layer for performing layer superimposition rendering, the following manner may be used. First, three RGB color components of each pixel in the foreground layer and the background layer are separated. A pixel in the foreground layer herein is referred to as a foreground pixel, and a pixel in the background layer is referred to as a background pixel. Three color components of a foreground pixel are then respectively multiplied by the value of alpha (that is, a transparency value), and three color components of a background pixel are respectively multiplied by an inverse value of alpha (that is, an inverse value of the transparency value). Further, color components that correspond to the corresponding foreground pixel and the background pixel are respectively added, and each color component is divided by a maximum value of alpha. Finally, each of the processed three color components are re-composed as one pixel for output.

For example, R represents a brightness value in the R channel, R_q represents a brightness value of a foreground pixel in the R channel, R_b represents a brightness value of a background pixel in the R channel, and alpha represents a transparency value in the alpha channel. A brightness value, in the R channel, of a pixel of a rendered page obtained after the superimposition and rendering is: R=[R_q*alpha+R_b*(256−alpha)]/256. Correspondingly, brightness values of other channels may also be calculated by using the foregoing formula.

It may be seen from the foregoing processes, a larger alpha value indicates a weak transparency effect. When the alpha value reaches the maximum value, the image is opaque. Conversely, if the alpha value is 0, the image is completely transparent. The value of alpha generally ranges from 0 to 255.

In the foregoing embodiment, the frequency domain mark image is converted into a corresponding transparent image according to the transparency parameter, the transparent image is used as a foreground layer, and a background layer is generated according to the target page data. The background layer is then superimposed with the foreground layer for performing layer superimposition rendering, so that the transparent image may be superimposed on the target page for display, that is, a watermark may be added to the target page.

According to the image processing method, a frequency domain mark image is obtained by performing frequency domain transformation on a spatial domain mark image, and layer superimposition rendering is performed on the frequency domain mark image and target page data according to a pre-configured transparency parameter. In this way, a transparentized frequency domain mark image is included in a displayed page. Because distribution locations of pixels are different in frequency domain and spatial domain, mark information can be adequately hidden, to achieve adequate robustness of compression resistance and smearing resistance. When a user captures or shares a displayed rendered image, a transmitted page image automatically includes the hidden frequency domain mark image, to facilitate infringement tracking, copyright protection, and other operations on leaked page data, thereby effectively protecting the page data.

In an embodiment, the image processing method further includes a step of protecting a sensitive page, the step including: obtaining a target page access instruction; determining a target page to which the target page access instruction points; querying a page identifier corresponding to the target page; and performing, when the page identifier is a sensitive page identifier, the operation of obtaining a frequency domain mark image.

The sensitive page is a page including sensitive information, and the sensitive information may include information related to an enterprise secret or employee privacy. The page identifier is used for uniquely identifying a page or a type of pages. That is, in an embodiment, different pages may have different page identifiers. Alternatively, pages of different types have different page identifiers (that is, pages of the same type have the same page identifier).

In an embodiment, the computer device may set a to-be-protected sensitive page in advance, and mark a page identifier of the to-be-protected sensitive page. For example, for an enterprise management application, an enterprise administrator in the enterprise management application may customize a sensitive page (for example, an enterprise organization structure page, a colleague work chat group, or an employee personal information page) that needs to be protected by using a hidden watermark. The enterprise administrator may mark a page identifier of the to-be-protected page from all page identifiers by using the computer device.

In an embodiment, the computer device may determine a target page to which the target page access instruction points, and query a page identifier corresponding to the target page. Only when the page identifier is a sensitive page identifier, that is, the target page is marked as a sensitive page, the computer device performs the step of obtaining the frequency domain mark image according to the target page access instruction. When the target page is a non-sensitive page, the target page may be directly displayed.

In an embodiment, after performing forward transformation on the spatial domain mark image by using a frequency domain transformation algorithm to obtain the frequency domain mark image, the computer device may store the frequency domain mark image (cached in an internal memory, stored as a file, or the like), and then obtain the frequency domain mark image from a corresponding storage medium when a user accesses a sensitive page.

In the foregoing embodiment, only when the page identifier of the target page to which the target page access instruction points is the sensitive page identifier, that is, when the user accesses a sensitive page, the frequency domain mark image is superimposed on the target page for final display. Therefore, the sensitive page can be effectively protected in a targeted manner, and when data of the sensitive page is leaked, it is convenient to perform infringement tracking and copyright protection.

In an embodiment, the step of converting the frequency domain mark image into a corresponding transparent image according to the transparency parameter includes the following steps: performing image scaling on the frequency domain mark image according to a preset size, to obtain a first mark image; splicing a plurality of first mark images to generate a second mark image, an image size of the second mark image matching a page size of the target page; and converting the second mark image into the corresponding transparent image according to the transparency parameter.

The target page may be a target page to which the target page access instruction points, or may be a target page to which the target page data transmitted by the page operation instruction points.

In an embodiment, when a transparent watermark image is added to the target page, that is, when the frequency domain mark image is superimposed on the target page, a preset size that is set in advance may be obtained. The preset size may be a fixed size that is set in advance, or may be a size that is dynamically determined according to a size relationship between the frequency domain mark image and the target page. For example, when the frequency domain mark image is superimposed on the target page, it may be set in advance that superimposition is performed according to a grid shape in an M*N format, that is, the target page is divided into M*N grid cells, and a corresponding frequency domain mark image is superimposed on each grid cell.

In an embodiment, the computer device may perform image scaling on the frequency domain mark image according to a preset size, to obtain a first mark image, and a plurality of same first mark images may be obtained in a similar manner. The plurality of first mark images are then spliced according to a size relationship between the first mark image and the target page, to generate a second mark image. An image size of the second mark image matches a page size of the target page.

In an embodiment, the computer device may divide the target page into M*N grid cells, and a region size corresponding to each grid cell is a size of the first mark image. The computer device may arrange the plurality of first mark images in a tiled manner, to generate a second mark image of a same size as the target page. Further, the computer device may perform transparency processing on the second mark image according to the transparency parameter, to obtain the transparent image.

In an embodiment, the computer device may first splice frequency domain mark images of a preset size into a second mark image, and then perform transparency processing on the second mark image according to the transparency parameter, to obtain the transparent image. Alternatively, the computer device may first perform transparency processing on frequency domain mark images, and then perform scaling processing on the transparentized frequency domain mark images, to obtain a second mark image through splicing. The second mark image herein is a transparent image that has an image size matching a page size of the target page.

In the foregoing embodiment, a plurality of first mark images of a preset size are spliced into a second mark image, and the second mark image of a page size matching a page size of the target page is then converted into the corresponding transparent image. Therefore, the target page may be marked in a tight and superimposed manner, to avoid missing the frequency domain mark image when some page data of the target page is captured, thereby greatly increasing a protection range of the target page.

In an embodiment, the image processing method further includes a step of generating a captured page image, the step including: displaying a rendered page obtained after the layer superimposition rendering; determining, when an image capture operation is performed, a target region designated by the image capture operation; and generating a captured page image according to pixels in the target region in the rendered page.

The image capture operation may be a picture capture operation, a screen capture operation, or the like. Optionally, the computer device may display a rendered page obtained after the layer superimposition rendering. The computer device detects an image capture operation, determines, when the image capture operation is performed, a target region designated by the image capture operation, and generates a captured page image according to pixels in the target region in the rendered page.

In the foregoing embodiment, when the image capture operation is performed, the captured page image obtained through capturing automatically includes the frequency domain mark image, that is, automatically includes frequency domain watermark information, to facilitate infringement tracking, copyright protection, and other operations on leaked page data, thereby effectively protecting the page data.

Figure 4:
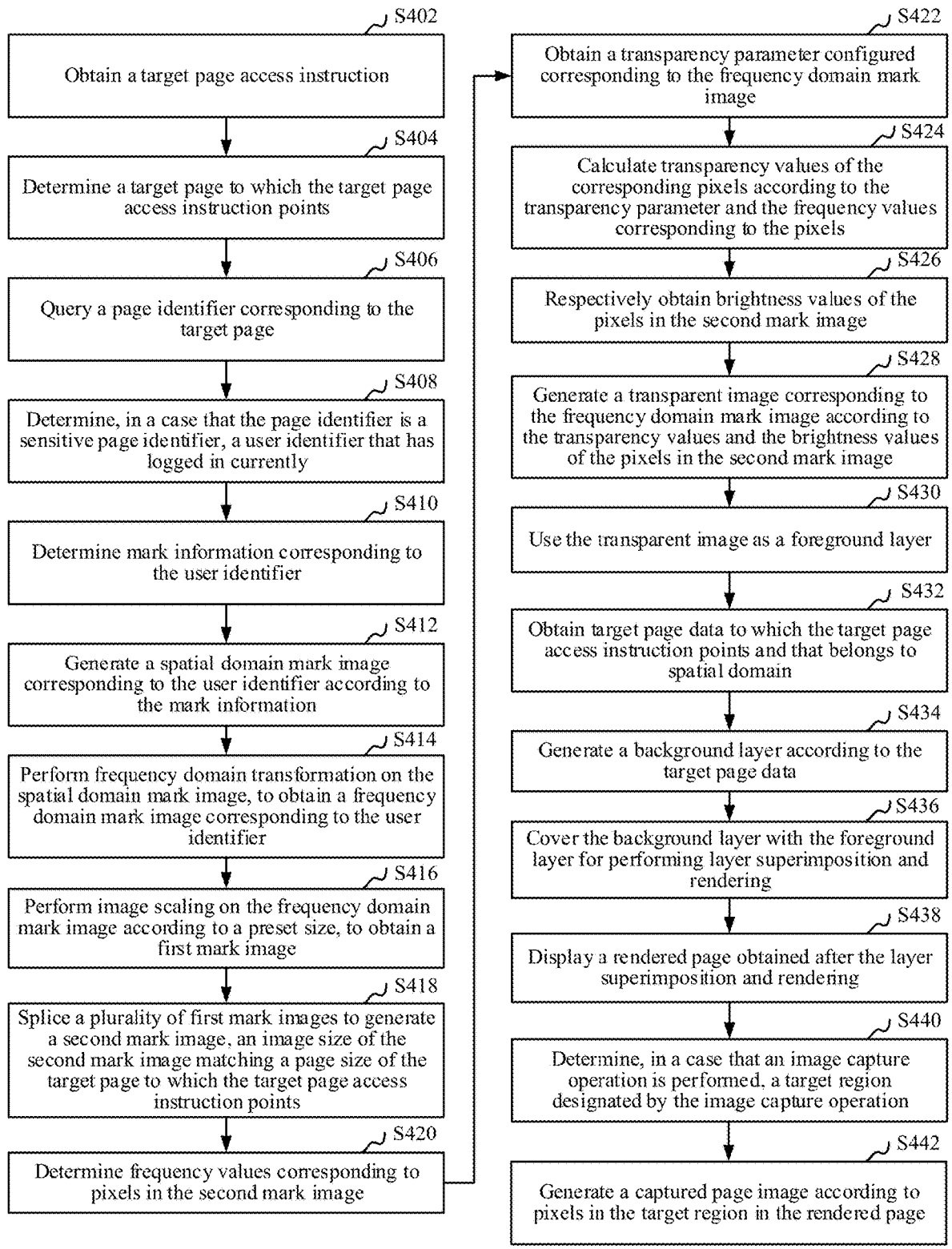
FIG. 4 is a schematic flowchart of an image processing method according to an embodiment.

Referring to FIG. 4, in an optional embodiment, the image processing method includes the following steps:

S402. Obtain a target page access instruction.

S404. Determine a target page to which the target page access instruction points.

S406. Query a page identifier corresponding to the target page.

S408. Determine, when the page identifier is a sensitive page identifier, a user identifier that has logged in currently.

S410. Determine mark information corresponding to the user identifier.

S412. Generate a spatial domain mark image corresponding to the user identifier according to the mark information.

S414. Perform frequency domain transformation on the spatial domain mark image, to obtain a frequency domain mark image corresponding to the user identifier.

S416. Perform image scaling on the frequency domain mark image according to a preset size, to obtain a first mark image.

S418. Splice a plurality of first mark images to generate a second mark image, an image size of the second mark image matching a page size of the target page to which the target page access instruction points.

S420. Determine frequency values corresponding to pixels in the second mark image.

S422. Obtain a transparency parameter configured corresponding to the frequency domain mark image.

S424. Calculate transparency values of the corresponding pixels according to the transparency parameter and the frequency values corresponding to the pixels.

S426. Respectively obtain brightness values of the pixels in the second mark image.

S428. Generate a transparent image corresponding to the frequency domain mark image according to the transparency values and the brightness values of the pixels in the second mark image.

S430. Use the transparent image as a foreground layer.

S432. Obtain target page data to which the target page access instruction points and that belongs to spatial domain.

S434. Generate a background layer according to the target page data.

S436. Superimpose the background layer with the foreground layer for performing layer superimposition rendering.

S438. Display a rendered page obtained after the layer superimposition rendering.

S440. Determine, when an image capture operation is performed, a target region designated by the image capture operation.

S442. Generate a captured page image according to pixels in the target region in the rendered page.

According to the image processing method, a frequency domain mark image is obtained by performing frequency domain transformation on a spatial domain mark image, and layer superimposition rendering is performed on the frequency domain mark image and target page data according to a pre-configured transparency parameter. In this way, a transparentized frequency domain mark image is included in a displayed page. Because distribution locations of pixels are different in frequency domain and spatial domain, mark information can be adequately hidden, to achieve adequate robustness of compression resistance and smearing resistance. When a user captures or shares a displayed rendered image, a transmitted page image automatically includes the hidden frequency domain mark image, to facilitate infringement tracking, copyright protection, and other operations on leaked page data, thereby effectively protecting the page data.

FIG. 4 is a schematic flowchart of an image processing method according to an embodiment. It is to be understood that, steps in the flowchart in FIG. 4 are displayed sequentially based on indication of arrows, but the steps are not necessarily performed sequentially based on the sequence indicated by the arrows. Unless otherwise explicitly specified in this specification, execution of the steps is not strictly limited, and the steps may be performed in other sequences. In addition, at least some steps in FIG. 4 may include a plurality of sub-steps or a plurality of stages. The sub-steps or the stages are not necessarily performed at the same moment, but may be performed at different moments. The sub-steps or the stages are not necessarily performed in sequence, but may be performed in turn or alternately with another step or at least some of sub-steps or stages of another step.

In an embodiment, to resolve a problem that there is no original image on an encoder side (that is, a problem of lacking an original image during addition of a watermark), an off-line encoding strategy is used in this application. That is, a frequency domain mark image is drawn in advance, and off-line encoding is then completed by using an alpha blending mechanism. In this application, a linearly separable frequency domain transformation algorithm, for example, Fourier transform, discrete cosine transform, or another algorithm, is used during transformation between frequency domain and spatial domain. Using Fourier transform as an example, the linear nature of Fourier transform may be represented as:

$$F(I_o+I_w)=F(I_o)+F(I_w)=f(I_w)+f(I_w); \text{ and}$$

$$F^{-1}(f_o+f_w)=F^{-1}(f_o)+F^{-1}(f_w)=I_o+I_w,$$

where F represents forward transformation, $F^{-1}$ represents inverse transformation, I represents a spatial domain image, and f represents a frequency domain image.

The two formulas indicate that both the forward transformation and the inverse transformation may be performed on an image in a splitting manner, which means that in an existing encoding process, an original spatial domain image is forward transformed into an original frequency domain image, weighted superimposition is performed on a spatial domain watermark image to obtain a superimposed image, and the superimposed image is then inversely transformed into an encoded image. According to the linearly separable nature, the encoded image may be split into an original image (wherein the original image is transformed from spatial domain to frequency domain, and the original image in frequency domain is transformed into spatial domain) and a watermark image (where in the watermark image is transformed from spatial domain to frequency domain), that is, an original image (in spatial domain) and a watermark image (in frequency domain). Based on the foregoing theoretical analysis, when there is no original image, a manner of adding a watermark to the "original image" is still feasible technically.

Figure 5:
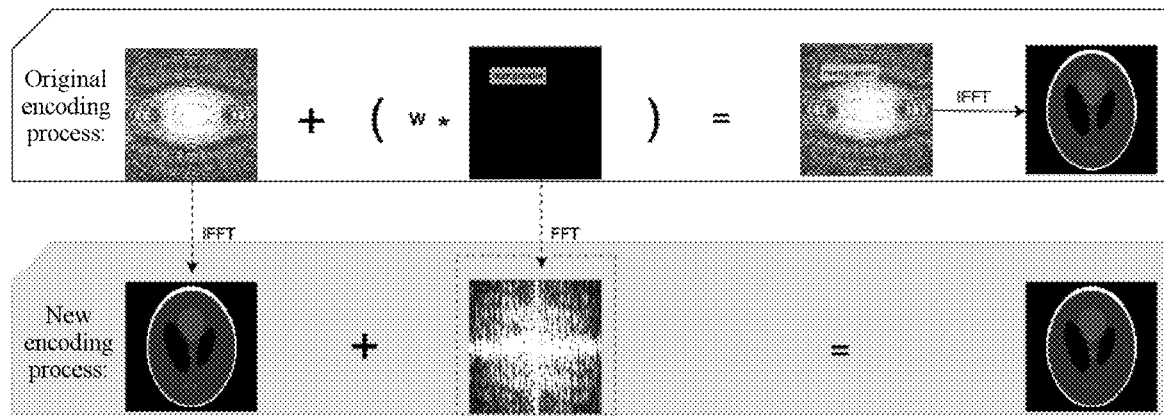
FIG. 5 is a flowchart of encoding of adding a watermark according to an embodiment.

FIG. 5 is a flowchart of encoding of adding a watermark according to an embodiment. Referring to FIG. 5, the upper half of FIG. 5 is a diagram of an original encoding process, whereas the lower half of FIG. 5 is a diagram of an encoding process used in this application. In the original encoding manner, fast Fourier transform (FFT) is first performed on an original image, to obtain an original frequency domain image, weighted superimposition is performed on a spatial domain watermark image to obtain a superimposed image, and the superimposed image is then inversely transformed into an encoded image through an inverse fast Fourier transform (IFFT). In the encoding manner used in this application, FFT is performed on a spatial domain watermark image, to obtain a frequency domain watermark image, and the transparentized frequency domain watermark image is then superimposed on an "original image" in spatial domain, to obtain an encoded image.

The frequency domain watermark image generated in the foregoing manner only needs to be simply superimposed on the original image for use as a result of encoding. Complex transformation from spatial domain to frequency domain does not need to be performed on the original image, that is, an automatic encoding solution without depending on the original image is implemented.

In an optional application scenario, for example, in a scenario in which a user uses an enterprise management application, an enterprise administrator in the enterprise management application may customize a sensitive page (for example, an enterprise organization structure page, a colleague work chat group, or an employee personal information page) that needs to be protected by using a hidden watermark. When the user logs in to a client, the client uses user information (identity information such as an employee card number, or an enterprise ID) corresponding to the user as watermark information, draws a watermark spectrum, and caches the watermark spectrum in an internal memory or stores the watermark spectrum in an entity. When the user accesses a corresponding sensitive page, the client performs transparency processing on the watermark spectrum according to a transparency parameter, and superimposes the transparentized watermark spectrum on a to-be-protected software interface for final display. If the user captures a picture on the software interface after the superimposition, the captured picture automatically includes encoded information with a watermark.

Correspondingly, when enterprise security personnel obtain the corresponding leaked captured picture, frequency domain transformation is first performed on the captured picture, and low-pass filtering is then performed on the captured picture, to decode watermark information in the captured picture. Alternatively, an average brightness value is subtracted from brightness values of pixels in the captured picture, and inverse frequency domain transformation is then performed on the captured picture, to decode watermark information in the captured picture. A user identity in the watermark image is recognized by using human eyes or in an optical character recognition (OCR) manner, to complete decoding of the watermark. The user identity obtained through decoding may be used for locating a corresponding user leaking the captured picture.

Figure 6:
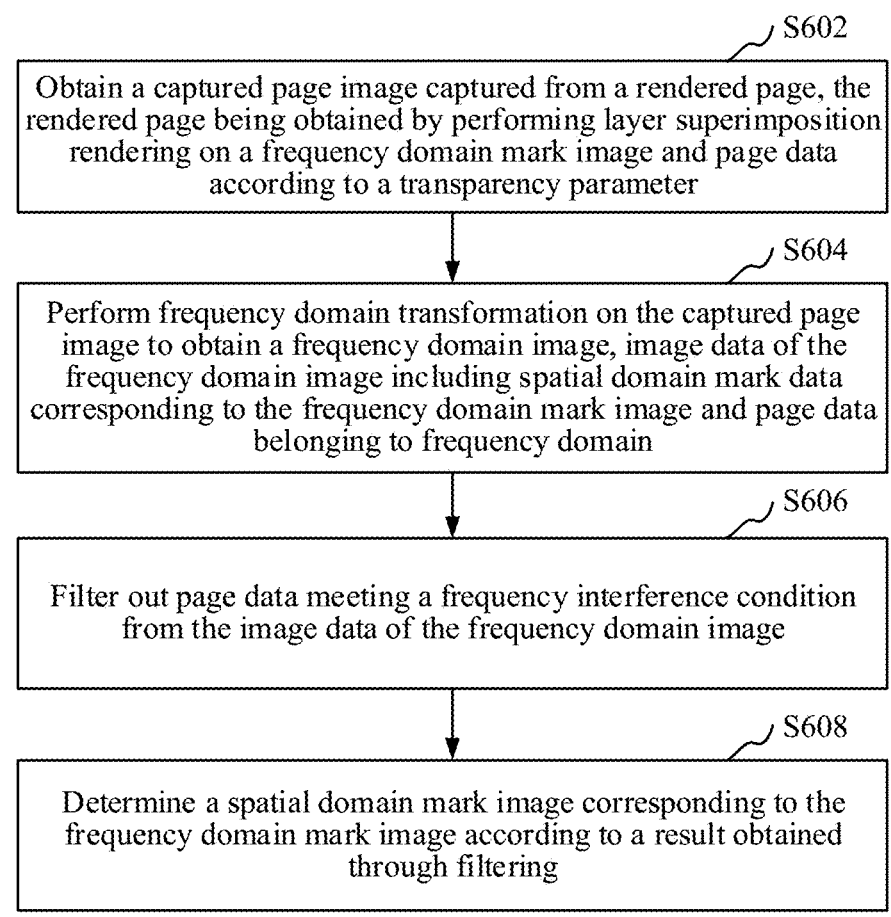
FIG. 6 is a schematic flowchart of an image processing method according to an embodiment.

As shown in FIG. 6, in an embodiment, an image processing method is provided. This embodiment is described by using an example in which the method is applied to the computer device (the terminal 110 or the server 120) in FIG. 1. Referring to FIG. 6, the image processing method includes the following steps:

S602. Obtain a captured page image captured from a rendered page, the rendered page being obtained by performing layer superimposition rendering on a frequency domain mark image and page data according to a transparency parameter.

Optionally, the computer device may obtain a rendered page by performing layer superimposition rendering on a frequency domain mark image and the page data in spatial domain according to a transparency parameter. The computer device detects an image capture operation, determines, when the image capture operation is performed, a target region designated by the image capture operation, and generates a captured page image according to pixels in the target region in the rendered page. For a description of the step of performing layer superimposition rendering on a frequency domain mark image and page data in spatial domain according to a transparency parameter, refer to the description of the image processing method. Details are not described again.

In an embodiment, the rendered page is obtained by performing layer superimposition rendering on a frequency domain mark image and page data according to a transparency parameter, so that an image captured from the rendered page automatically includes the hidden frequency domain mark image. When the captured page image is leaked, the image processing method may be performed to obtain the spatial domain mark image through decoding. Therefore, a corresponding user leaking the captured page image can be located, to facilitate infringement tracking and copyright protection. The decoding is a process of recognizing mark information from the captured page image.

S604. Perform frequency domain transformation on the captured page image to obtain a frequency domain image, image data of the frequency domain image including spatial domain mark data corresponding to the frequency domain mark image and page data in frequency domain.

Optionally, when obtaining the captured page image, the computer device may perform frequency domain transformation on the captured page image by using a linearly separable frequency domain transformation algorithm, for example, wavelet transform, discrete cosine transform, or Fourier transform, to obtain a frequency domain image. Correspondingly, the transparentized frequency domain mark image included in the captured page image is converted into a spatial domain mark image through inverse transformation. Therefore, the image data of the frequency domain image includes mark data that is in spatial domain and corresponds to the frequency domain mark image and the page data in frequency domain.

In an embodiment, the image processing method further includes an image division step, the step including: obtaining an image size corresponding to the frequency domain mark image; dividing the captured page image into a plurality of page region images according to the image size. Step S604 includes: respectively performing frequency domain transformation on the page region images to obtain a plurality of frequency domain images.

In an embodiment, when the frequency domain mark image is superimposed on the target page for display, image scaling may be performed on the frequency domain mark image according to a preset size, to obtain a first mark image, a plurality of same first mark images may be obtained in a similar manner, and the plurality of first mark images may be spliced to generate a second mark image. An image size of the second mark image matches a page size of the target page. The second mark image is then converted into the corresponding transparent image according to the transparency parameter. The transparent image is used as a foreground layer, and a background layer generated according to target page data is superimposed with the foreground layer for performing layer superimposition rendering.

Therefore, when performing corresponding decoding on a captured page image captured from a rendered page, the computer device divides the captured page image into a plurality of page region images according to a preset size. Image data of each page region image includes frequency domain mark data. In this way, the computer device may respectively perform corresponding decoding on the plurality of page region images at the same time, to obtain the spatial domain mark image. That is, the computer device respectively performs frequency domain transformation on the page region images to obtain a plurality of frequency domain images, then filters out page data satisfying a frequency interference condition from image data of the frequency domain images, and determines the spatial domain mark image corresponding to the frequency domain mark image according to a filtering result corresponding to each page region image.

In an embodiment, the computer device may select the clearest image from spatial domain mark images obtained by decoding the page region images, and perform image recognition in a manual recognition manner or an OCR manner, to obtain mark information.

In an embodiment, it is found through a lot of practice that when the frequency domain mark image is superimposed on the target page for display, superimposition is performed according to a grid shape in a 4*4 format, that is, the target page is divided into 4*4 grid cells. When a corresponding frequency domain mark image is superimposed on each grid cell, at least one grid region in which one background color accounts for a large portion may be found in the target page. Because the frequency domain algorithm has a characteristic of smearing resistance to a specific extent, and other colors of the grid region accounts for a small portion, there is substantially no impact on a final decoding result, to implement successful decoding.

In the foregoing embodiment, the captured page image is divided into a plurality of page region images according to an image size corresponding to the frequency domain mark image, and frequency domain transformation is then respectively performed on the plurality of page region images to obtain a plurality of frequency domain images. In this way, page data satisfying a frequency interference condition may be respectively filtered out from the plurality of frequency domain images, thereby accurately determining a spatial domain mark image.

S606. Filter out page data meeting a frequency interference condition from the image data of the frequency domain image.

The frequency interference condition is a condition that the magnitude of a frequency meets the magnitude of an interference frequency, which may be that the frequency of a pixel in the image data reaches the interference frequency, or a frequency is a preset frequency. Optionally, the computer device may filter out page data satisfying a frequency interference condition from the image data of the frequency domain image. In this step, to reduce the interference of page data to the mark image, a higher degree of filtering out page data has a better effect. Based on the reversibility and a linear feature of a frequency domain transformation algorithm, the frequency domain image obtained by performing inverse transformation on the captured page image may still be regarded as an image obtained by superimposing a spatial domain mark image on the frequency domain target page.

When the target page from which the captured page image is captured is mainly a "simple background", it may be learned that in this case, page data in frequency domain is concentrated in the "upper left corner" of the frequency domain image, that is, "one noise" close to a low-frequency region. Therefore, when filtering is performed, it may be preferentially considered to filter out the noise. When the target page from which the captured page image is captured includes complex page information, page data in frequency domain is distributed in a high-frequency region of the frequency domain image. In this case, the page data may be filtered out in a low-pass filtering manner. A frequency domain threshold of the low-pass filtering manner may be an average frequency of the frequency domain image or a preset threshold.

S608. Determine a spatial domain mark image corresponding to the frequency domain mark image according to a filtering result.

Optionally, after the computer device filters out the page data meeting a frequency interference condition from the frequency domain image, the remaining page data is mark data in spatial domain. The computer device may determine a spatial domain mark image corresponding to the frequency domain mark image according to a filtering result. Further, image recognition may be performed on the spatial domain mark image in a manual recognition manner or an OCR manner, to obtain mark information.

In an embodiment, when performing image decoding on the captured page image, the computer device may respectively perform corresponding decoding according to three image channels, that is, R, G, and B. That is, in the image channels, the computer device respectively performs frequency domain transformation on page data included in the captured page image, and then performs filtering, to obtain a spatial domain mark image. For example, in the R channel, the computer device may obtain brightness values, in the R channel, of pixels in the captured page image, further performs frequency domain transformation on the pixels, and then performs filtering, to determine a spatial domain mark image in the R channel. In this way, spatial domain mark images in the channels may be respectively obtained, and mark information is further recognized according to the spatial domain mark images in the channels.

Figure 7:
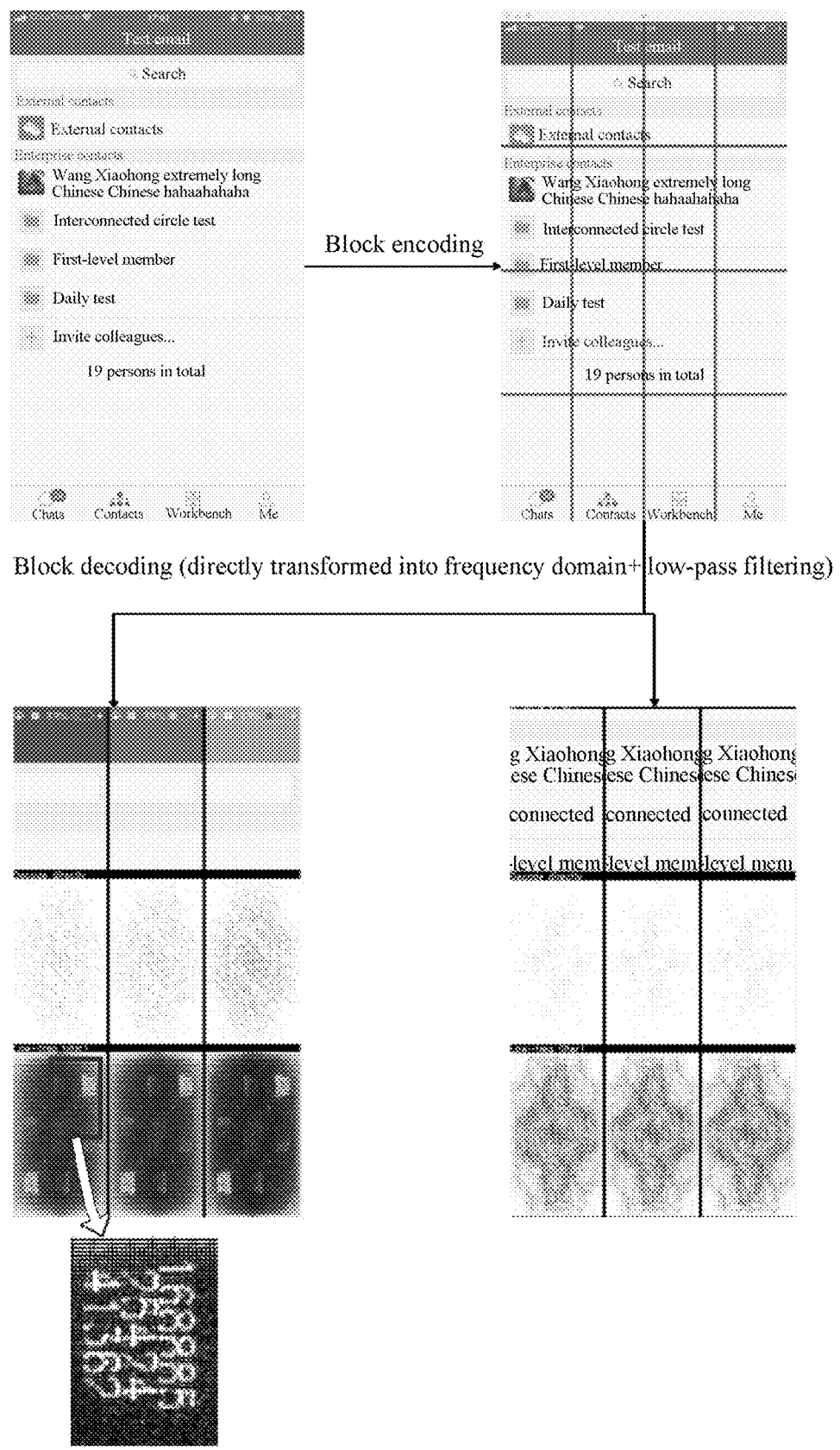
FIG. 7 is a schematic diagram of an interface of decoding a captured page image according to an embodiment.

For example, FIG. 7 is a schematic diagram of an interface of decoding a captured page image according to an embodiment. The two images in the upper left corner and the upper right corner of FIG. 7 represent that when the frequency domain mark image is superimposed on the target page, superimposition is performed according to a grid shape in a 4*4 format, that is, a page region of the target page is divided into 4*4 grid cells, and a corresponding frequency domain mark image is superimposed on each grid cell. Images on the lower side of FIG. 7 are schematic diagrams of decoding a page region image in a single grid cell. Images in the lower left corner and the lower right corner of FIG. 7 are schematic diagrams of decoding page region images in different grid cells. The image in the lower left corner of FIG. 7 is a schematic diagram of a page region image with a relatively simple background. The image in the lower right corner of FIG. 7 is a schematic diagram of a page region image with a relatively complex background.

Block decoding results in FIG. 7 respectively represent processing results in the three image channels from left to right. The first row shows original encoded image blocks, the second row shows results of direct decoding, where the watermark image is susceptible to interference from the background, resulting in a decoding failure, and the third row shows results obtained after low-pass filtering. According to the results, in the 4*4 blocks, it may be substantially ensured that there is at least one region having a relatively simple background, and original watermark information can be recognized after direct decoding and low-pass filtering are performed on the encoded images.

According to the image processing method, a captured page image is captured from a rendered page, the rendered page being obtained by performing layer superimposition rendering on a frequency domain mark image and page data according to a transparency parameter. In this way, when a user captures a displayed rendered image, a captured page image automatically includes the hidden frequency domain mark image. Frequency domain transformation is performed on the captured page image to obtain a frequency domain image, page data meeting a frequency interference condition is then filtered out from the image data of the frequency domain image, and a spatial domain mark image corresponding to the frequency domain mark image is determined according to a filtering result. In this way, the spatial domain mark image may be extracted from the captured page image by performing frequency domain transformation and filtering, thereby obtaining hidden mark information. Infringement tracking, copyright protection, and other operations can be performed on leaked page data according to the mark information, thereby effectively protecting the page data.

Figure 8:
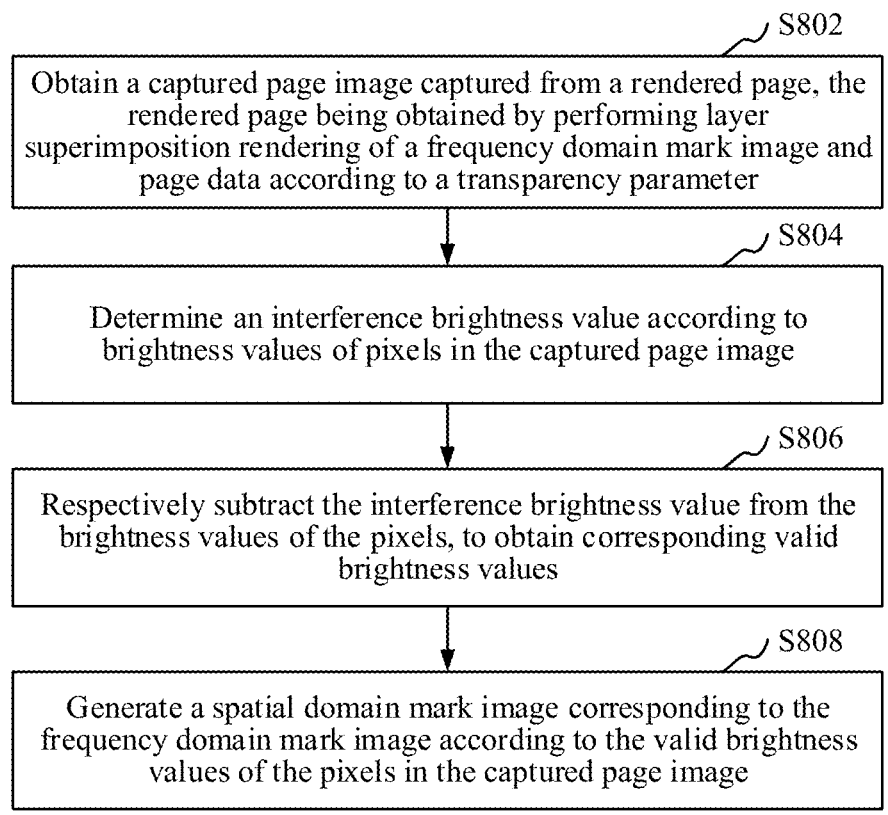
FIG. 8 is a schematic flowchart of an image processing method according to an embodiment.

As shown in FIG. 8, in an embodiment, an image processing method is provided. This embodiment is described by using an example in which the method is applied to the computer device (the terminal 110 or the server 120) in FIG. 1. Referring to FIG. 8, the image processing method includes the following steps:

S802. Obtain a captured page image captured from a rendered page, the rendered page being obtained by performing layer superimposition rendering on a frequency domain mark image and page data according to a transparency parameter.

Optionally, the computer device may obtain a rendered page by performing layer superimposition rendering on a frequency domain mark image and page data in spatial domain according to a transparency parameter. The computer device detects an image capture operation, determines, when the image capture operation is performed, a target region designated by the image capture operation, and generates a captured page image according to pixels in the target region in the rendered page. For a description of the step of performing layer superimposition rendering on a frequency domain mark image and page data in spatial domain according to a transparency parameter, refer to the description of the image processing method. Details are not described again.

S804. Determine an interference brightness value according to brightness values of pixels in the captured page image.

The interference brightness value is a brightness value interfering with recognition of mark information, or may be understood as a brightness value of each pixel presenting the target page in the captured page image. Optionally, the computer device may determine an interference brightness value according to brightness values of pixels in the captured page image.

In an embodiment, the computer device may obtain a rendered page by performing layer superimposition rendering on a frequency domain mark image and page data according to a transparency parameter. The frequency domain mark image included in the rendered page is transparentized. That is, corrected brightness values of pixels presenting the frequency domain mark image in the captured page image are relatively small. Therefore, the computer device may comprehensively determine a brightness value of an interference pixel according to brightness values of pixels in the captured page image. For example, the computer device may determine brightness values of pixels in the captured page image, calculate an average brightness value of the pixels in the captured page image, and use the average brightness value as an interference brightness value. Alternatively, the computer device may determine, according to brightness values of pixels in the captured page image, a brightness value that appears most frequently in the brightness values of the pixels as an interference brightness value. Alternatively, the computer device may use a median value of brightness values of pixels in the captured page image as an interference brightness value.

In particular, when a "background image" of the captured page image only has one color or has a simple image, an average brightness value of pixels in the captured page image or a mode value or a median value of brightness values as a brightness value of each pixel in the "background image".

S806. Respectively subtract the interference brightness value from the brightness values of the pixels, to obtain corresponding corrected brightness values.

Optionally, the computer device may respectively subtract the interference brightness value from the brightness values of the pixels in the captured page image, to obtain corresponding corrected brightness values. It may be considered that a "background image" is filtered out from the captured page image, to finally obtain a "foreground image".

S808. Generate a spatial domain mark image corresponding to the frequency domain mark image according to the corrected brightness values of the pixels in the captured page image.

Optionally, after the computer device respectively subtracts the interference brightness value from the brightness values of the pixels, to obtain the corresponding corrected brightness values, the corrected brightness values of the pixels may be considered as brightness values of the pixels in the frequency domain mark image. The computer device performs inverse frequency domain transformation on the captured page image according to the corrected brightness values of the pixels in the captured page image, to obtain a spatial domain mark image. Further, image recognition may be performed on the spatial domain mark image in a manual recognition manner or an OCR manner, to obtain mark information.

In an embodiment, when performing image decoding on the captured page image, the computer device may respectively perform corresponding decoding according to three image channels, that is, R, G, and B. That is, in each image channel, the computer device determines an interference brightness value according to brightness values of pixels in the captured page image, respectively subtracts the interference brightness value from the brightness values of the pixels, to obtain corresponding corrected brightness values, and generates a spatial domain mark image corresponding to the frequency domain mark image according to the corrected brightness values of the pixels in the captured page image. For example, in the R channel, the computer device may obtain brightness values, in the R channel, of pixels in the captured page image, further determines an interference brightness value in the R channel, and then respectively subtracts the interference brightness value from the brightness values of the pixels in the R channel, to obtain corrected brightness values, thereby generating a spatial domain mark image in the R channel. In this way, spatial domain mark images in the channels may be respectively obtained, and mark information is further recognized according to the spatial domain mark images in the channels.

According to the image processing method, a captured page image is captured from a rendered page, the rendered page being obtained by performing layer superimposition rendering of a frequency domain mark image and page data according to a transparency parameter. When a user captures a displayed rendered image, a captured page image automatically includes the hidden frequency domain mark image. An interference brightness value is determined according to brightness values of pixels in the captured page image, and the interference brightness value is respectively subtracted from the brightness values of the pixels, to obtain corresponding corrected brightness values. A spatial domain mark image corresponding to the frequency domain mark image is then generated according to the corrected brightness values of the pixels. In this way, it is convenient to effectively extract the spatial domain mark image from the captured page image, thereby obtaining hidden mark information. Infringement tracking, copyright protection, and other operations can be performed on leaked page data according to the mark information, thereby effectively protecting the page data.

In an embodiment, the image processing method further includes an image division step, the step including: obtaining an image size corresponding to the frequency domain mark image; and dividing the captured page image into a plurality of page region images according to the image size. The step of determining an interference brightness value according to brightness values of pixels in the captured page image includes: determining, according to brightness values of pixels in each page region image, an interference brightness value corresponding to the each page region image. The step of generating a spatial domain mark image corresponding to the frequency domain mark image according to the corrected brightness values of the pixels in the captured page image includes: generating the spatial domain mark image corresponding to the frequency domain mark image according to corrected brightness values of the pixels in the each page region image.

In an embodiment, when the frequency domain mark image is superimposed on the target page for display, image scaling may be performed on the frequency domain mark image according to a preset size, to obtain a first mark image, and a plurality of first mark images are spliced to generate a second mark image. An image size of the second mark image matches a page size of the target page to which a target page access instruction points. The second mark image is then converted into the corresponding transparent image according to the transparency parameter. The transparent image is used as a foreground layer, and a background layer generated according to target page data is superimposed with the foreground layer for performing layer superimposition rendering.

Therefore, when performing corresponding decoding on a captured page image captured from a rendered page, the computer device divides the captured page image into a plurality of page region images according to a preset size. Image data of each page region image includes spatial domain mark data. In this way, the computer device may respectively perform corresponding decoding on the plurality of page region images at the same time, to obtain the spatial domain mark image. That is, the computer device respectively determines an interference brightness value corresponding to each page region image, respectively subtracts, for the each page region image, the corresponding interference brightness value from brightness values of pixels in the each page region image, to obtain corresponding corrected brightness values, and then generates the spatial domain mark image corresponding to the frequency domain mark image according to corrected brightness values of the pixels in the each page region image.

In an embodiment, the computer device may select the clearest image from spatial domain mark images obtained by decoding the page region images, and perform image recognition in a manual recognition manner or an OCR manner, to obtain mark information.

In an embodiment, when the computer device respectively performs corresponding decoding on the plurality of page region images, there may be an image with only one background color in the plurality of page region images, that is, brightness values of pixels in a "background image" are extremely close. In addition, a frequency domain mark image included in a page region image is transparentized, that is, brightness values of pixels in a "foreground image" are small. Therefore, an average brightness value of pixels in the page region image may be used as a brightness value of each pixel in a "background image", that is, an interference brightness value. Corresponding corrected brightness values may be obtained by respectively subtracting the interference brightness value from brightness values of pixels in each page region image.

In an embodiment, it is found through a lot of practice that when the frequency domain mark image is superimposed on the target page for display, superimposition is performed according to a grid shape in a 4*4 format, that is, the target page is divided into 4*4 grid cells. When a corresponding frequency domain mark image is superimposed on each grid cell, at least one grid region in which one background color accounts for a large portion may be found in the target page. Because the frequency domain algorithm has a characteristic of smearing resistance to a specific extent, and other colors of the grid region accounts for a small portion, there is substantially no impact on a final decoding result, to implement successful decoding.

In the foregoing embodiment, the captured page image is divided into a plurality of page region images according to an image size corresponding to the frequency domain mark image, and interference brightness values corresponding to the plurality of page region images are then respectively determined, so that corrected brightness values corresponding to each page region image can be determined more accurately. In this way, the spatial domain mark image may be accurately determined in a manner in which decoding is performed in small grid ranges and on a plurality of images, thereby greatly improving the accuracy of image decoding.

Figure 9:
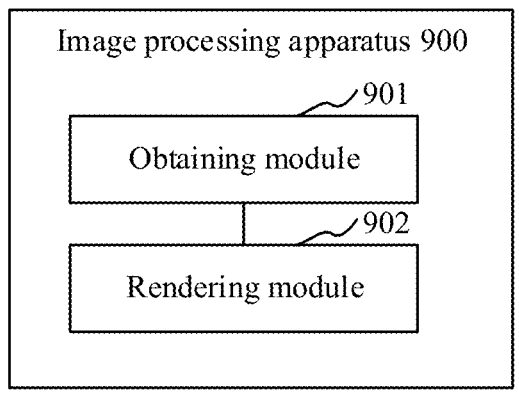
FIG. 9 is a structural block diagram of an image processing apparatus according to an embodiment.

As shown in FIG. 9, in an embodiment, an image processing apparatus 900 is provided, including an obtaining module 901 and a rendering module 902.

The obtaining module 901 is configured to obtain a frequency domain mark image, the frequency domain mark image being obtained by performing frequency domain transformation on a spatial domain mark image.

The obtaining module 901 is further configured to obtain a transparency parameter configured corresponding to the frequency domain mark image.

The obtaining module 901 is further configured to obtain target page data.

The rendering module 902 is configured to perform layer superimposition rendering of the frequency domain mark image and the target page data according to the transparency parameter.

In an embodiment, the image processing apparatus 900 further includes a determining module 903, a query module 904, and an execution module 905.

The obtaining module 901 is further configured to obtain a target page access instruction.

The determining module 903 is configured to determine a target page to which the target page access instruction points.

The query module 904 is configured to query a page identifier corresponding to the target page.

The execution module 905 is configured to perform, when the page identifier is a sensitive page identifier, the operation of obtaining a frequency domain mark image.

In an embodiment, the obtaining module 901 is further configured to obtain a page operation instruction. The execution module 905 is further configured to perform, when the page operation instruction is used for transmitting the target page data, the operation of obtaining a frequency domain mark image.

In an embodiment, the obtaining module 901 is further configured to: determine a user identifier that has logged in currently; and obtain a frequency domain mark image corresponding to the user identifier.

In an embodiment, the image processing apparatus 900 further includes a generation module 906 and a frequency domain transformation module 907.

The obtaining module 901 is further configured to obtain a user identifier.

The determining module 903 is further configured to determine mark information corresponding to the user identifier.

The generation module 906 is configured to generate a spatial domain mark image corresponding to the user identifier according to the mark information.

The frequency domain transformation module 907 is configured to perform frequency domain transformation on the spatial domain mark image, to obtain the frequency domain mark image corresponding to the user identifier.

In an embodiment, the rendering module 902 is further configured to: convert the frequency domain mark image into a corresponding transparent image according to the transparency parameter; use the transparent image as a foreground layer; generate a background layer according to the target page data; and superimpose the background layer with the foreground layer for performing layer superimposition rendering.

In an embodiment, the rendering module 902 is further configured to: perform image scaling on the frequency domain mark image according to a preset size, to obtain a first mark image; splice a plurality of first mark images to generate a second mark image, an image size of the second mark image matching a page size of the target page; and convert the second mark image into the corresponding transparent image according to the transparency parameter.

In an embodiment, the rendering module 902 is further configured to: determine frequency values corresponding to pixels in the frequency domain mark image; calculate transparency values of the corresponding pixels according to the transparency parameter and the frequency values corresponding to the pixels; respectively obtain brightness values of the pixels in the frequency domain mark image; and generate the transparent image corresponding to the frequency domain mark image according to the transparency values and the brightness values of the pixels in the frequency domain mark image.

Figure 10:
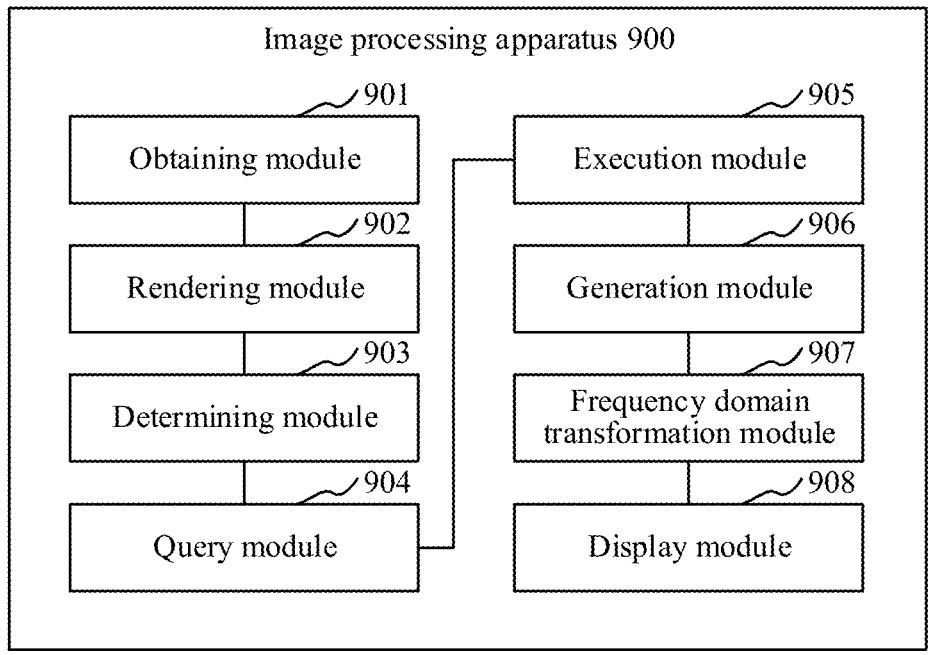
FIG. 10 is a structural block diagram of an image processing apparatus according to another embodiment.

Referring to FIG. 10, in an embodiment, the image processing apparatus 900 further includes a display module 908.

The display module 908 is configured to display a rendered page obtained after the layer superimposition rendering.

The determining module 903 is further configured to determine, when an image capture operation is performed, a target region designated by the image capture operation.

The generation module 906 generates a captured page image according to pixels in the target region in the rendered page.

According to the image processing apparatus, a frequency domain mark image is obtained by performing frequency domain transformation on a spatial domain mark image, and layer superimposition rendering is performed on the frequency domain mark image and target page data according to a pre-configured transparency parameter. In this way, a transparentized frequency domain mark image is included in a displayed page. Because distribution locations of pixels are different in frequency domain and spatial domain, mark information can be adequately hidden, to achieve adequate robustness of compression resistance and smearing resistance. When a user captures or shares a displayed rendered image, a transmitted page image automatically includes the hidden frequency domain mark image, to facilitate infringement tracking, copyright protection, and other operations on leaked page data, thereby effectively protecting the page data.

Figure 11:
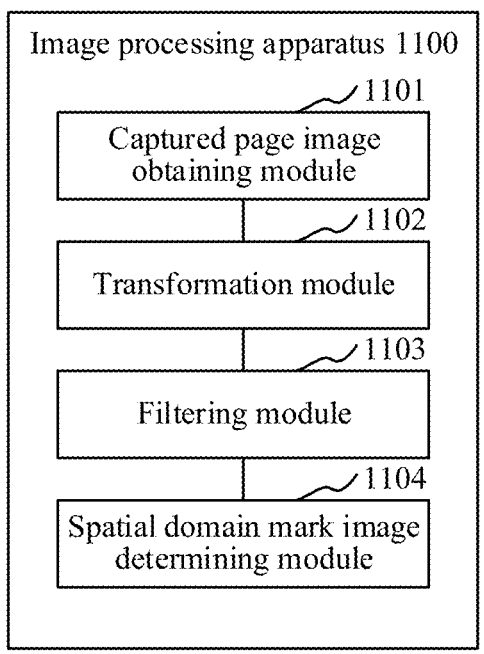
FIG. 11 is a structural block diagram of an image processing apparatus according to an embodiment.

As shown in FIG. 11, in an embodiment, an image processing apparatus 1100 is provided, including a captured page image obtaining module 1101, a transformation module 1102, a filtering module 1103, and a spatial domain mark image determining module 1104.

The captured page image obtaining module 1101 is configured to obtain a captured page image captured from a rendered page, the rendered page being obtained by performing layer superimposition rendering on a frequency domain mark image and page data in spatial domain according to a transparency parameter.

The transformation module 1102 is configured to perform frequency domain transformation on the captured page image to obtain a frequency domain image, image data of the frequency domain image including spatial domain mark data corresponding to the frequency domain mark image and page data in frequency domain.

The filtering module 1103 is configured to filter out page data meeting a frequency interference condition from the image data of the frequency domain image.

The spatial domain mark image determining module 1104 is configured to determine a spatial domain mark image corresponding to the frequency domain mark image according to a filtering result.

In an embodiment, the image processing apparatus 1100 further includes a division module 1105. The captured page image obtaining module 1101 is further configured to obtain an image size corresponding to the frequency domain mark image. The division module 1105 is configured to divide the captured page image into a plurality of page region images according to the image size. The transformation module 1102 is further configured to respectively perform frequency domain transformation on the page region images to obtain a plurality of frequency domain images.

According to the image processing apparatus, a captured page image is captured from a rendered page, the rendered page being obtained by performing layer superimposition rendering on a frequency domain mark image and page data according to a transparency parameter. In this way, when a user captures a displayed rendered image, a captured page image automatically includes the hidden frequency domain mark image. Frequency domain transformation is performed on the captured page image to obtain a frequency domain image, page data meeting a frequency interference condition is then filtered out from the image data of the frequency domain image, and a spatial domain mark image corresponding to the frequency domain mark image is determined according to a filtering result. In this way, the spatial domain mark image may be extracted from the captured page image by performing frequency domain transformation and filtering, thereby obtaining hidden mark information. Infringement tracking, copyright protection, and other operations can be performed on leaked page data according to the mark information, thereby effectively protecting the page data.

Figure 12:
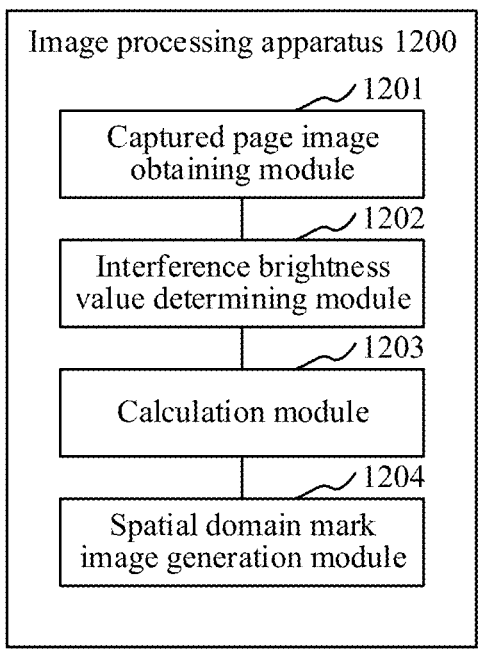
FIG. 12 is a structural block diagram of an image processing apparatus according to an embodiment.

As shown in FIG. 12, in an embodiment, an image processing apparatus 1200 is provided, including a captured page image obtaining module 1201, an interference brightness value determining module 1202, a calculation module 1203, and a spatial domain mark image generation module 1204.

The captured page image obtaining module 1201 is configured to obtain a captured page image captured from a rendered page, the rendered page being obtained by performing layer superimposition rendering on a frequency domain mark image and page data in spatial domain according to a transparency parameter.

The interference brightness value determining module 1202 is configured to determine an interference brightness value according to brightness values of pixels in the captured page image.

The calculation module 1203 is configured to respectively subtract the interference brightness value from the brightness values of the pixels, to obtain corresponding corrected brightness values.

The spatial domain mark image generation module 1204 is configured to generate a spatial domain mark image corresponding to the frequency domain mark image according to the corrected brightness values of the pixels in the captured page image.

In an embodiment, the image processing apparatus 1200 further includes a division module 1205. The captured page image obtaining module 1201 is further configured to obtain an image size corresponding to the frequency domain mark image. The division module 1205 is configured to divide the captured page image into a plurality of page region images according to the image size. The interference brightness value determining module 1202 is further configured to determine, according to brightness values of pixels in each page region image, an interference brightness value corresponding to the each page region image. The spatial domain mark image generation module 1204 is further configured to generate the spatial domain mark image corresponding to the frequency domain mark image according to corrected brightness values of the pixels in the each page region image.

According to the image processing apparatus, a captured page image is captured from a rendered page, the rendered page being obtained by performing layer superimposition rendering on a frequency domain mark image and page data according to a transparency parameter. When a user captures a displayed rendered image, a captured page image automatically includes the hidden frequency domain mark image. An interference brightness value is determined according to brightness values of pixels in the captured page image, and the interference brightness value is respectively subtracted from the brightness values of the pixels, to obtain corresponding corrected brightness values. A spatial domain mark image corresponding to the frequency domain mark image is then generated according to the corrected brightness values of the pixels. In this way, it is convenient to effectively extract the spatial domain mark image from the captured page image, thereby obtaining hidden mark information. Infringement tracking, copyright protection, and other operations can be performed on leaked page data according to the mark information, thereby effectively protecting the page data.

Figure 13:
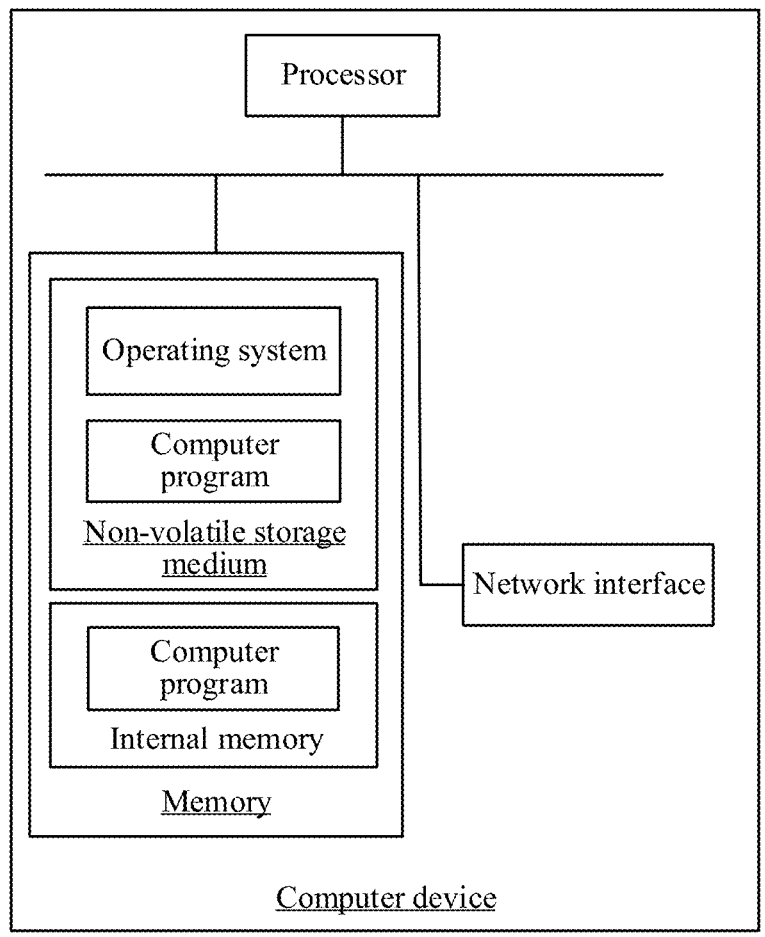
FIG. 13 is a structural block diagram of a computer device according to an embodiment.

FIG. 13 is a diagram of an internal structure of a computer device according to an embodiment. The computer device may be the terminal 110 or the server 120 in FIG. 1. As shown in FIG. 10, the computer device includes a processor, a memory, a network interface, an input apparatus, and a display screen that are connected by a system bus. The memory includes a non-volatile storage medium and an internal memory. The non-volatile storage medium of the computer device stores an operating system and may further store a computer program, the computer program, when executed by the processor, causing the processor to implement the image processing method. The internal memory may also store a computer program, the computer program, when executed by the processor, causing the processor to perform the image processing method.

A person skilled in the art may understand that, the structure shown in FIG. 13 is only a block diagram of a partial structure related to the solution of this application, and does not constitute a limitation to the computer device to which the solution of this application is applied. The computer device may include more or fewer components than those shown in the figure, or some components may be combined, or a different component deployment may be used.

In an embodiment, the image processing apparatus provided in this application may be implemented in the form of a computer program. The computer program may be run on the computer device shown in FIG. 13. A memory of the computer device may store program modules forming the image processing apparatus, for example, the obtaining module and the rendering module shown in FIG. 9. A computer program formed by the program modules causes the processor to perform the steps in the image processing method in the embodiments of this application described in this specification.

For example, the computer device shown in FIG. 13 may perform steps S202, S204, and S206 by using the obtaining module in the image processing apparatus shown in FIG. 9. The computer device may perform step S208 by using the rendering module.

In an embodiment, the image processing apparatus provided in this application may be implemented in the form of a computer program. The computer program may be run on the computer device shown in FIG. 13. A memory of the computer device may store program modules forming the image processing apparatus, for example, the captured page image obtaining module, the transformation module, the filtering module, and the spatial domain mark image determining module shown in FIG. 11. A computer program formed by the program modules causes the processor to perform the steps in the image processing method in the embodiments of this application described in this specification.

For example, the computer device shown in FIG. 13 may perform step S602 by using the captured page image obtaining module in the image processing apparatus shown in FIG. 11. The computer device may perform step S604 by using the transformation module. The computer device may perform step S606 by using the filtering module. The computer device may perform step S608 by using the spatial domain mark image determining module.

In an embodiment, the image processing apparatus provided in this application may be implemented in the form of a computer program. The computer program may be run on the computer device shown in FIG. 13. A memory of the computer device may store program modules forming the image processing apparatus, for example, the captured page image obtaining module, the determining module, the calculation module, and the spatial domain mark image generation module shown in FIG. 12. A computer program formed by the program modules causes the processor to perform the steps in the image processing method in the embodiments of this application described in this specification.

For example, the computer device shown in FIG. 13 may perform step S802 by using the captured page image obtaining module in the image processing apparatus shown in FIG. 12. The computer device may perform step S804 by using the determining module. The computer device may perform step S806 by using the calculation module. The computer device may perform step S808 by using the spatial domain mark image generation module.

In an embodiment, a computer device is provided, including a memory and a processor, the memory storing a computer program, the computer program, when executed by the processor, causing the processor to perform operations of the image processing method. The computer program, when executed by the processor, causes the processor to perform the following steps: obtaining a frequency domain mark image, the frequency domain mark image being obtained by performing frequency domain transformation on a spatial domain mark image; obtaining a transparency parameter configured corresponding to the frequency domain mark image; obtaining target page data; and performing layer superimposition rendering on the frequency domain mark image and the target page data according to the transparency parameter.

In an optional embodiment, the computer program, when executed by the processor, causes the processor to perform the following steps: obtaining a page operation instruction; and performing, when the page operation instruction is used for transmitting the target page data, the operation of obtaining a frequency domain mark image.

In an optional embodiment, the computer program, when executed by the processor, causes the processor to perform the following steps: obtaining a target page access instruction; determining a target page to which the target page access instruction points; querying a page identifier corresponding to the target page; and performing, when the page identifier is a sensitive page identifier, the operation of obtaining a frequency domain mark image.

In an optional embodiment, the computer program, when executed by the processor, causes the processor to perform the following steps: determining a user identifier that has logged in currently; and obtaining a frequency domain mark image corresponding to the user identifier.

In an optional embodiment, the computer program, when executed by the processor, causes the processor to perform the following steps: obtaining a user identifier; determining mark information corresponding to the user identifier; generating a spatial domain mark image corresponding to the user identifier according to the mark information; and performing frequency domain transformation on the spatial domain mark image, to obtain the frequency domain mark image corresponding to the user identifier.

In an optional embodiment, the computer program, when executed by the processor, causes the processor to perform the following steps: converting the frequency domain mark image into a corresponding transparent image according to the transparency parameter; using the transparent image as a foreground layer; generating a background layer according to the target page data; and performing layer superimposition rendering by superimposing the background layer with the foreground layer.

In an optional embodiment, the computer program, when executed by the processor, causes the processor to perform the following steps: performing image scaling on the frequency domain mark image according to a preset size, to obtain a first mark image; splicing a plurality of first mark images to generate a second mark image, an image size of the second mark image matching a page size of the target page; and converting the second mark image into the corresponding transparent image according to the transparency parameter.

In an optional embodiment, the computer program, when executed by the processor, causes the processor to perform the following steps: determining frequency values corresponding to pixels in the frequency domain mark image; calculating transparency values of the corresponding pixels according to the transparency parameter and the frequency values corresponding to the pixels; respectively obtaining brightness values of the pixels in the frequency domain mark image; and generating the transparent image corresponding to the frequency domain mark image according to the transparency values and the brightness values of the pixels in the frequency domain mark image.

In an optional embodiment, the computer program, when executed by the processor, causes the processor to perform the following steps: displaying a rendered page obtained after the layer superimposition rendering; determining, when an image capture operation is performed, a target region designated by the image capture operation; and generating a captured page image according to pixels in the target region in the rendered page.

In an embodiment, a computer device is further provided, including a memory and a processor, the memory storing a computer program, the computer program, when executed by the processor, causing the processor to perform operations of the image processing method. The computer program, when executed by the processor, causes the processor to perform the following steps: obtaining a captured page image captured from a rendered page, the rendered page being obtained by performing layer superimposition rendering on a frequency domain mark image and page data according to a transparency parameter; performing frequency domain transformation on the captured page image to obtain a frequency domain image, image data of the frequency domain image including spatial domain mark data corresponding to the frequency domain mark image and page data in frequency domain; filtering out page data meeting a frequency interference condition from the image data of the frequency domain image; and determining a spatial domain mark image corresponding to the frequency domain mark image according to a filtering result.

In an optional embodiment, the computer program, when executed by the processor, causes the processor to perform the following steps: obtaining an image size corresponding to the frequency domain mark image; and dividing the captured page image into a plurality of page region images according to the image size.

The computer program, when executed by the processor, causes the processor to perform the following step: respectively performing frequency domain transformation on the page region images to obtain a plurality of frequency domain images.

In an embodiment, a computer device is further provided, including a memory and a processor, the memory storing a computer program, the computer program, when executed by the processor, causing the processor to perform operations of the image processing method. The computer program, when executed by the processor, causes the processor to perform the following steps: obtaining a captured page image captured from a rendered page, the rendered page being obtained by performing layer superimposition rendering on a frequency domain mark image and page data according to a transparency parameter; determining an interference brightness value according to brightness values of pixels in the captured page image; respectively subtracting the interference brightness value from the brightness values of the pixels, to obtain corresponding corrected brightness values; and generating a spatial domain mark image corresponding to the frequency domain mark image according to the corrected brightness values of the pixels in the captured page image.

In an optional embodiment, the computer program, when executed by the processor, causes the processor to perform the following steps: obtaining an image size corresponding to the frequency domain mark image; and dividing the captured page image into a plurality of page region images according to the image size.

The computer program, when executed by the processor, causes the processor to perform the following step: determining, according to brightness values of pixels in each page region image, an interference brightness value corresponding to the each page region image.

The computer program, when executed by the processor, causes the processor to perform the following step: generating the spatial domain mark image corresponding to the frequency domain mark image according to corrected brightness values of the pixels in the each page region image.

In an embodiment, a computer-readable storage medium is provided, storing a computer program, the computer program, when executed by a processor, causing the processor to perform operations of the image processing method. The computer program, when executed by the processor, causes the processor to perform the following steps: obtaining a frequency domain mark image, the frequency domain mark image being obtained by performing frequency domain transformation on a spatial domain mark image; obtaining a transparency parameter configured corresponding to the frequency domain mark image; obtaining target page data; and performing layer superimposition rendering on the frequency domain mark image and the target page data according to the transparency parameter.

In an optional embodiment, the computer program, when executed by the processor, causes the processor to perform the following steps: obtaining a page operation instruction; and performing, when the page operation instruction is used for transmitting the target page data, the operation of obtaining a frequency domain mark image.

In an optional embodiment, the computer program, when executed by the processor, causes the processor to perform the following steps: obtaining a target page access instruction; determining a target page to which the target page access instruction points; querying a page identifier corresponding to the target page; and performing, when the page identifier is a sensitive page identifier, the operation of obtaining a frequency domain mark image.

In an optional embodiment, the computer program, when executed by the processor, causes the processor to perform the following steps: determining a user identifier that has logged in currently; and obtaining a frequency domain mark image corresponding to the user identifier.

In an optional embodiment, the computer program, when executed by the processor, causes the processor to perform the following steps: obtaining a user identifier; determining mark information corresponding to the user identifier; generating a spatial domain mark image corresponding to the user identifier according to the mark information; and performing frequency domain transformation on the spatial domain mark image, to obtain the frequency domain mark image corresponding to the user identifier.

In an optional embodiment, the computer program, when executed by the processor, causes the processor to perform the following steps: converting the frequency domain mark image into a corresponding transparent image according to the transparency parameter; using the transparent image as a foreground layer; generating a background layer according to the target page data; and performing layer superimposition rendering by superimposing the background layer with the foreground layer.

In an optional embodiment, the computer program, when executed by the processor, causes the processor to perform the following steps: performing image scaling on the frequency domain mark image according to a preset size, to obtain a first mark image; splicing a plurality of first mark images to generate a second mark image, an image size of the second mark image matching a page size of the target page; and converting the second mark image into the corresponding transparent image according to the transparency parameter.

In an optional embodiment, the computer program, when executed by the processor, causes the processor to perform the following steps: determining frequency values corresponding to pixels in the frequency domain mark image; calculating transparency values of the corresponding pixels according to the transparency parameter and the frequency values corresponding to the pixels; respectively obtaining brightness values of the pixels in the frequency domain mark image; and generating the transparent image corresponding to the frequency domain mark image according to the transparency values and the brightness values of the pixels in the frequency domain mark image.

In an optional embodiment, the computer program, when executed by the processor, causes the processor to perform the following steps: displaying a rendered page obtained after the layer superimposition rendering; determining, when an image capture operation is performed, a target region designated by the image capture operation; and generating a captured page image according to pixels in the target region in the rendered page.

In an embodiment, a computer-readable storage medium is further provided, storing a computer program, the computer program, when executed by a processor, causing the processor to perform operations of the image processing method. The computer program, when executed by the processor, causes the processor to perform the following steps: obtaining a captured page image captured from a rendered page, the rendered page being obtained by performing layer superimposition rendering on a frequency domain mark image and page data according to a transparency parameter; performing frequency domain transformation on the captured page image to obtain a frequency domain image, image data of the frequency domain image including spatial domain mark data corresponding to the frequency domain mark image and page data in frequency domain; filtering out page data meeting a frequency interference condition from the image data of the frequency domain image; and determining a spatial domain mark image corresponding to the frequency domain mark image according to a filtering result.

In an optional embodiment, the computer program, when executed by the processor, causes the processor to perform the following steps: obtaining an image size corresponding to the frequency domain mark image; and dividing the captured page image into a plurality of page region images according to the image size.

The computer program, when executed by the processor, causes the processor to perform the following step: respectively performing frequency domain transformation on the page region images to obtain a plurality of frequency domain images.

In an embodiment, a computer-readable storage medium is further provided, storing a computer program, the computer program, when executed by a processor, causing the processor to perform operations of the image processing method. The computer program, when executed by the processor, causes the processor to perform the following steps: obtaining a captured page image captured from a rendered page, the rendered page being obtained by performing layer superimposition rendering on a frequency domain mark image and page data according to a transparency parameter; determining an interference brightness value according to brightness values of pixels in the captured page image; respectively subtracting the interference brightness value from the brightness values of the pixels, to obtain corresponding corrected brightness values; and generating a spatial domain mark image corresponding to the frequency domain mark image according to the corrected brightness values of the pixels in the captured page image.

In an optional embodiment, the computer program, when executed by the processor, causes the processor to perform the following steps: obtaining an image size corresponding to the frequency domain mark image; and dividing the captured page image into a plurality of page region images according to the image size.

The computer program, when executed by the processor, causes the processor to perform the following step: determining, according to brightness values of pixels in each page region image, an interference brightness value corresponding to the each page region image.

The computer program, when executed by the processor, causes the processor to perform the following step: generating the spatial domain mark image corresponding to the frequency domain mark image according to corrected brightness values of the pixels in the each page region image.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments are performed. Any reference to a memory, a storage, a database, or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or a cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments show only several implementations of this application and are described in detail, which, however, are not to be construed as a limitation to the patent scope of this application. A person of ordinary skill in the art may further make variations and improvements without departing from the ideas of this application, which all fall within the protection scope of this application. Therefore, the protection scope of this application is subject to the protection scope of the appended claims.

What is claimed is:

1. An image processing method, applicable to a computer device, the method comprising:
    obtaining target page data;
    obtaining a page operation instruction for transmitting the target page data;
    obtaining a frequency domain mark image, in response to the page operation instruction, the frequency domain mark image being obtained from frequency domain transformation of a spatial domain mark image;
    obtaining a transparency parameter configured corresponding to the frequency domain mark image; and
    performing layer superimposition rendering of the frequency domain mark image and the target page data according to the transparency parameter.

2. The method according to claim 1, wherein the target page data is in spatial domain.

3. The method according to claim 1, further comprising:
    obtaining a target page access instruction;
    determining a target page the target page access instruction points to;
    querying a page identifier corresponding to the target page; and
    performing, in response to determining that the page identifier is a sensitive page identifier, the operation of obtaining the frequency domain mark image.

4. The method according to claim 1, wherein obtaining the frequency domain mark image comprises:
    determining a user identifier; and
    obtaining a frequency domain mark image corresponding to the user identifier.

5. The method according to claim 4, further comprising:
determining mark information corresponding to the user identifier;
generating a spatial domain mark image corresponding to the user identifier according to the mark information; and
performing frequency domain transformation on the spatial domain mark image to obtain the frequency domain mark image corresponding to the user identifier.

6. The method according to claim 1, wherein performing the layer superimposition rendering of the frequency domain mark image and the target page data according to the transparency parameter comprises:
converting the frequency domain mark image into a corresponding transparent image according to the transparency parameter;
using the transparent image as a foreground layer;
generating a background layer according to the target page data; and
performing the layer superimposition rendering by superimposing the background layer with the foreground layer.

7. The method according to claim 6, wherein converting the frequency domain mark image into the corresponding transparent image according to the transparency parameter comprises:
performing image scaling on the frequency domain mark image according to a preset size, to obtain a first mark image;
splicing a plurality of copies of the first mark image to generate a second mark image, an image size of the second mark image matching a page size of a target page; and
converting the second mark image into the corresponding transparent image according to the transparency parameter.

8. The method according to claim 6, wherein converting the frequency domain mark image into the corresponding transparent image according to the transparency parameter comprises:
determining frequency values corresponding to pixels in the frequency domain mark image;
calculating transparency values of the corresponding pixels according to the transparency parameter and the frequency values corresponding to the pixels;
obtaining brightness values of the pixels in the frequency domain mark image; and
generating the transparent image corresponding to the frequency domain mark image according to the transparency values and the brightness values of the pixels in the frequency domain mark image.

9. The method according to claim 1, further comprising:
displaying a rendered page obtained after the layer superimposition rendering;
determining, when an image capture operation is performed, a target region designated by the image capture operation; and
generating a captured page image according to pixels in the target region in the rendered page.

10. The method according to claim 1, comprising:
obtaining a captured page image captured from a rendered page, the rendered page being obtained by the step of performing layer superimposition rendering of the frequency domain mark image and the target page data according to the transparency parameter;
performing frequency domain transformation on the captured page image to obtain a frequency domain image, image data of the frequency domain image comprising spatial domain mark data corresponding to the frequency domain mark image and frequency domain target page data; and
determining a spatial domain mark image corresponding to the frequency domain mark image according to the frequency domain image.

11. An image processing method, applicable to a computer device, the method comprising:
obtaining a captured page image captured from a rendered page, the rendered page being obtained by performing layer superimposition rendering of a frequency domain mark image and page data according to a transparency parameter;
obtaining an image size corresponding to the frequency domain mark image;
dividing the captured page image into a plurality of page region images according to the image size;
performing frequency domain transformation on the captured page image to obtain a frequency domain image by respectively performing frequency domain transformation on the page region images to obtain a plurality of frequency domain images, image data of the frequency domain image comprising spatial domain mark data corresponding to the frequency domain mark image and frequency domain page data;
filtering out page data satisfying a frequency interference condition from the image data of the frequency domain image to generate a filtering result; and
determining a spatial domain mark image corresponding to the frequency domain mark image according to the filtering result.

12. An image processing method, applicable to a computer device, the method comprising:
obtaining a captured page image captured from a rendered page, the rendered page being obtained by performing layer superimposition rendering on a frequency domain mark image and page data according to a transparency parameter;
obtaining an image size corresponding to the frequency domain mark image;
dividing the captured page image into a plurality of page region images according to the image size;
determining an interference brightness value according to brightness values of pixels in the captured page image by:
determining, according to the brightness values of pixels in each page region image, an interference brightness value corresponding to the each page region image;
respectively subtracting the interference brightness value from the brightness values of the pixels to obtain corresponding corrected brightness values; and
generating a spatial domain mark image corresponding to the frequency domain mark image according to the corrected brightness values of the pixels in the captured page image by:
generating the spatial domain mark image corresponding to the frequency domain mark image according to the corrected brightness values of the pixels in the each page region image.

13. A non-transitory computer-readable storage medium, storing a computer program, the computer program, when executed by a processor, causing the processor to perform the method of claim 1.

14. A non-transitory computer-readable storage medium, storing a computer program, the computer program, when executed by a processor, causing the processor to perform the method of claim 11.

15. A non-transitory computer-readable storage medium, storing a computer program, the computer program, when executed by a processor, causing the processor to perform the method of claim 12.

16. A computer device, comprising a memory and a processor, the memory storing a computer program, the computer program, when executed by the processor, causing the processor to perform the method of claim 1.

17. A computer device, comprising a memory and a processor, the memory storing a computer program, the computer program, when executed by the processor, causing the processor to perform the method of claim 11.

18. A computer device, comprising a memory and a processor, the memory storing a computer program, the computer program, when executed by the processor, causing the processor to perform the method of claim 12.

19. The non-transitory computer-readable storage medium of claim 13, wherein the computer program, when executed by the processor, causes the processor to obtain the frequency domain mark image by:
   determining a user identifier; and
   obtaining a frequency domain mark image corresponding to the user identifier.

20. The non-transitory computer-readable storage medium of claim 13, wherein the computer program, when executed by the processor, causes the processor to perform the layer superimposition rendering of the frequency domain mark image and the target page data according to the transparency parameter by:
   converting the frequency domain mark image into a corresponding transparent image according to the transparency parameter;
   using the transparent image as a foreground layer;
   generating a background layer according to the target page data; and
   performing the layer superimposition rendering by superimposing the background layer with the foreground layer.

* * * * *